US012688638B2

(12) United States Patent
Kang et al.

(10) Patent No.: US 12,688,638 B2
(45) Date of Patent: Jul. 21, 2026

(54) ELECTRONIC DEVICE FOR GENERATING THREE-DIMENSIONAL PHOTO BASED ON IMAGES ACQUIRED FROM PLURALITY OF CAMERAS, AND METHOD THEREFOR

(71) Applicant: SAMSUNG ELECTRONICS CO., LTD., Suwon-si (KR)

(72) Inventors: Seonghoon Kang, Suwon-si (KR); Yerin Park, Suwon-si (KR); Hyoin Ahn, Suwon-si (KR); Jaeik Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 18/425,459

(22) Filed: Jan. 29, 2024

(65) Prior Publication Data

US 2024/0203012 A1 Jun. 20, 2024

Related U.S. Application Data

(63) Continuation of application No. PCT/KR2022/010179, filed on Jul. 13, 2022.

(30) Foreign Application Priority Data

Sep. 13, 2021 (KR) ......................... 10-2021-0121695
Sep. 29, 2021 (KR) ......................... 10-2021-0129297

(51) Int. Cl.
*G06T 13/20* (2011.01)
*H04N 13/243* (2018.01)
*H04N 23/63* (2023.01)

(52) U.S. Cl.
CPC ........... *G06T 13/20* (2013.01); *H04N 13/243* (2018.05); *H04N 23/632* (2023.01); *H04N 23/633* (2023.01)

(58) Field of Classification Search
CPC .... G06T 13/20; H04N 13/243; H04N 23/632; H04N 23/633; H04N 23/631;
(Continued)

(56) References Cited

U.S. PATENT DOCUMENTS 9,167,231 B2 10/2015 Kawakami
9,720,089 B2 8/2017 Katz
(Continued)

FOREIGN PATENT DOCUMENTS

CN 105955456 A * 9/2016 ........... H04N 13/344
EP 2 533 541 12/2012
(Continued)

OTHER PUBLICATIONS

"Mint Julep »To The Sea«", Feb. 15, 2012, 3 pages, https://vimeo.com/36867236.
(Continued)

*Primary Examiner* — Haixia Du
(74) *Attorney, Agent, or Firm* — Nixon & Vanderhye, P.C.

(57) ABSTRACT

An example electronic device may display, based on at least a portion of a plurality of images obtained through a first camera of the electronic device, a preview image on the display; receive a shooting input while displaying the preview image; in response to receiving the shooting input, obtain a first image including a first visual object through the first camera; obtain a second image including a second visual object through a second camera of the electronic device; obtain a third image converted from the second image and including the second visual object having a size corresponding to a size of the first visual object; and obtain a fourth image to provide animation with respect to a subject, by displaying the third image after displaying the first image.

17 Claims, 20 Drawing Sheets

(58) Field of Classification Search

CPC .............. H04N 23/671; H04N 23/675; H04N 2213/006; H04N 13/133; H04N 13/25; H04N 13/239; H04M 1/72403; H04M 1/0214; H04M 1/72454; H04M 2250/52

See application file for complete search history.

(56) References Cited

U.S. PATENT DOCUMENTS

| | | | |
|---|---|---|---|
| 9,906,773 | B2 | 2/2018 | Kim |
| 10,506,153 | B2 | 12/2019 | Kang |
| RE47,925 | E | 3/2020 | Torma |
| 11,582,391 | B2 | 2/2023 | Kim et al. |
| 11,893,700 | B2 | 2/2024 | Ninan et al. |
| 2009/0066786 | A1 | 3/2009 | Landa |
| 2012/0050279 | A1* | 3/2012 | Nishibe ................ H04N 13/139 345/419 |
| 2012/0162379 | A1 | 6/2012 | Dahi et al. |
| 2014/0071245 | A1* | 3/2014 | Zhang ................. H04N 25/705 348/47 |
| 2014/0240471 | A1 | 8/2014 | Srinivasa |
| 2015/0285631 | A1 | 10/2015 | Kubota et al. |
| 2015/0292871 | A1* | 10/2015 | Kaneko .................. H04N 23/62 348/135 |
| 2016/0253786 | A1 | 9/2016 | Bains |
| 2017/0070664 | A1 | 3/2017 | Yoon |
| 2017/0227841 | A1* | 8/2017 | Niemela .............. H04N 13/189 |
| 2018/0232894 | A1* | 8/2018 | Kim ......................... G01S 3/00 |
| 2021/0120184 | A1 | 4/2021 | Cohen |
| 2021/0136296 | A1 | 5/2021 | Kim |
| 2021/0374717 | A1* | 12/2021 | Seol ................... G06Q 20/3278 |
| 2022/0254126 | A1 | 8/2022 | Ninan |

FOREIGN PATENT DOCUMENTS

| | | | |
|---|---|---|---|
| JP | 2011171813 | A | 9/2011 |
| JP | 5785732 | B2 | 7/2015 |
| KR | 20130070034 | A | 6/2013 |
| KR | 20190021108 | | 3/2019 |
| KR | 20190021108 | A | 3/2019 |
| KR | 101992511 | B1 | 6/2019 |
| KR | 20200005440 | A | 1/2020 |
| KR | 102087414 | | 3/2020 |
| KR | 102087414 | B1 | 3/2020 |
| KR | 102149463 | B1 | 8/2020 |
| KR | 102223281 | B1 | 3/2021 |
| KR | 102391497 | B1 | 4/2022 |

OTHER PUBLICATIONS

"Scopi—3D Wigglegram Camera", updated Dec. 2, 2019, 3 pages, https://play.google.com/store/apps/details?id=com.adrix.scopi.

International Search Report for PCT/KR2022/010179 mailed Oct. 17, 2022, 5 pages.

Written Opinion of the ISA for PCT/KR2022/010179 mailed Oct. 17, 2022, 6 pages.

Extended Search Report dated Nov. 19, 2024 in European Patent Application No. 22867533.6.

Notification of the Reasons for Rejection dated Nov. 25, 2025 in Korean Patent Application No. 10-2021-0129297 and English-language translation.

* cited by examiner 400-1

IDENTIFY SECOND CAMERA HAVING DISPARITY WITH RESPECT TO FIRST CAMERA USED TO DISPLAY PREVIEW IMAGE AMONG PLURAL CAMERAS INCLUDED IN ELECTRONIC DEVICE —1110

OBTAIN SECOND IMAGE USING SECOND CAMERA —1120

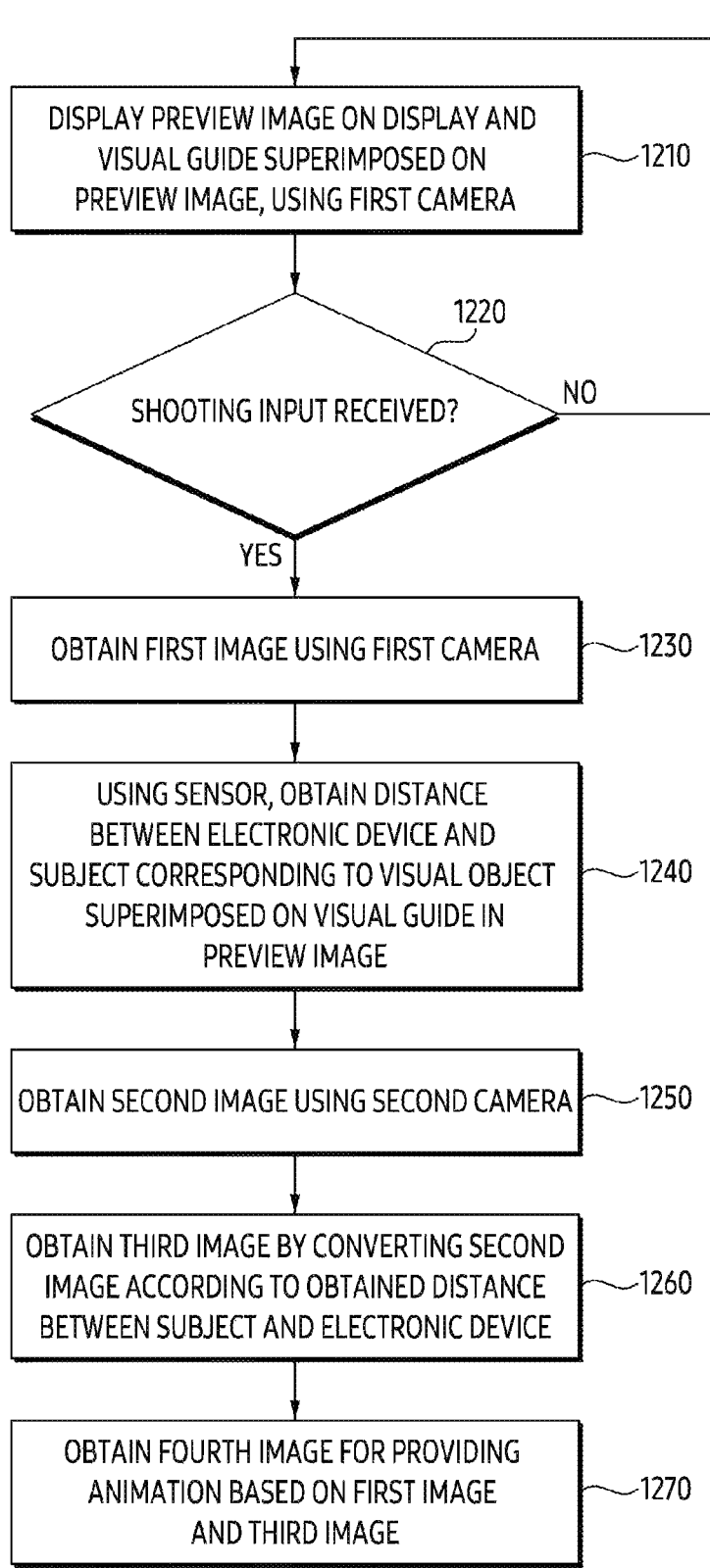

DISPLAY PREVIEW IMAGE ON DISPLAY AND VISUAL GUIDE SUPERIMPOSED ON PREVIEW IMAGE, USING FIRST CAMERA ~1210

SHOOTING INPUT RECEIVED? 1220

NO

YES

OBTAIN FIRST IMAGE USING FIRST CAMERA ~1230

USING SENSOR, OBTAIN DISTANCE BETWEEN ELECTRONIC DEVICE AND SUBJECT CORRESPONDING TO VISUAL OBJECT SUPERIMPOSED ON VISUAL GUIDE IN PREVIEW IMAGE ~1240

OBTAIN SECOND IMAGE USING SECOND CAMERA ~1250

OBTAIN THIRD IMAGE BY CONVERTING SECOND IMAGE ACCORDING TO OBTAINED DISTANCE BETWEEN SUBJECT AND ELECTRONIC DEVICE ~1260

OBTAIN FOURTH IMAGE FOR PROVIDING ANIMATION BASED ON FIRST IMAGE AND THIRD IMAGE ~1270

ELECTRONIC DEVICE FOR GENERATING THREE-DIMENSIONAL PHOTO BASED ON IMAGES ACQUIRED FROM PLURALITY OF CAMERAS, AND METHOD THEREFOR

CROSS-REFERENCE TO RELATED APPLICATIONS

This application is a continuation of PCT/KR2022/010179 filed on Jul. 13, 2022, designating the United States, in the Korean Intellectual Property Receiving Office, which claims priority to Korean Patent Application No. 10-2021-0121695, filed on Sep. 13, 2021, in the Korean Intellectual Property Office and to Korean Patent Application No. 10-2021-0129297, filed on Sep. 29, 2021, in the Korean Intellectual Property Office. The contents of each of these applications are incorporated by reference herein in their entireties.

BACKGROUND

Field

The disclosure relates to an electronic device and a method for generating a stereoscopic photograph based on images obtained from a plurality of cameras.

Description of Related Art

With recent developments in electronic technology, functions performed by electronic devices are increasing. For example, in order to assist a user in creating various types of multimedia contents, the number of cameras included in an electronic device is increasing and the performance of the camera is being further improved. For example, to facilitate photographing subjects at different distances, the electronic device may include a plurality of cameras having different fields-of-view (FOVs).

SUMMARY

An electronic device according to various embodiments may include a display, a plurality of cameras including a first camera and a second camera having a second field-of-view (FoV) different from a first FoV of the first camera, a memory, and a processor operatively coupled to the display, the plurality of cameras and the memory, wherein the memory stores one or more instructions. The one or more instructions, when executed by the processor, may cause the processor to display, based on at least a portion of a plurality of images obtained through the first camera, a preview image on the display, each of the plurality of images may including a first visual object corresponding to a subject included in the first FoV; receive a shooting input while displaying the preview image; in response to receiving the shooting input, obtain a first image including the first visual object through the first camera; obtain a second image including a second visual object corresponding to the subject through the second camera; obtain a third image that is converted from the second image and includes the second visual object having a size corresponding to a size of the first visual object; and obtain, by displaying the third image after displaying the first image, a fourth image to provide animation with respect to the subject.

A method of an electronic device according to various embodiments may include displaying, based on at least portion of a plurality of images obtained through a first camera among a plurality of cameras of the electronic device, a preview image on a display of the electronic device, each of the plurality of images including a first visual object corresponding to a subject included in a first FoV of the first camera; receiving a shooting input while displaying the preview image, and in response to receiving the shooting input, obtaining a first image including the first visual object through the first camera; obtaining a second image including a second visual object corresponding to the subject through a second camera among the plurality of cameras different from the first camera; obtaining a third image that is converted from the second image and includes the second visual object having a size corresponding to a size of the first visual object; and obtaining, by displaying the third image after displaying the first image, a fourth image to provide animation with respect to the subject.

An electronic device according to various embodiments may include a display, a plurality of cameras having different fields-of-view (FoVs), a memory, and a processor operatively coupled to the display, the plurality of cameras and the memory, wherein the memory stores one or more instructions. The one or more instructions, when executed by the processor, may cause to processor to control to display a preview image on the display, using a first camera among the plurality of cameras, the preview image including a first visual object corresponding to a subject included in a first FoV to which the first camera faces; receive a shooting input related to the first camera, while displaying the preview image; in response to receiving the shooting input, identify from among the plurality of cameras a second camera having a second FOV including the subject and having a disparity with respect to the first FOV of the first camera; in response to the processor identifying the second camera, obtain a first image including the first visual object through the first camera; and obtain a second image including a second visual object corresponding to the subject through the identified second camera.

A method of an electronic device according to various embodiments may include displaying a preview image on a display of the electronic device, using a first camera among a plurality of cameras included in the electronic device, the preview image including a first visual object corresponding to a subject included in a first FoV to which the first camera faces; receiving a shooting input related to the first camera, while displaying the preview image; in response to receiving the shooting input, identifying, from among the plurality of cameras, a second camera having a second FOV including the subject and having a disparity with respect to the first FOV of the first camera; and in response to identifying the second camera, obtaining a first image including the first visual object through the first camera, and obtaining a second image including a second visual object corresponding to the subject through the identified second camera.

BRIEF DESCRIPTION OF THE DRAWINGS

The above and/or other aspects of the disclosure will be more apparent by describing certain embodiments of the disclosure with reference to the accompanying drawings, in which:

FIG. 12 is a flowchart illustrating an example operation performed by an example electronic device based on a distance between a subject and the electronic device, according to various embodiments.

DETAILED DESCRIPTION

Figure 1:
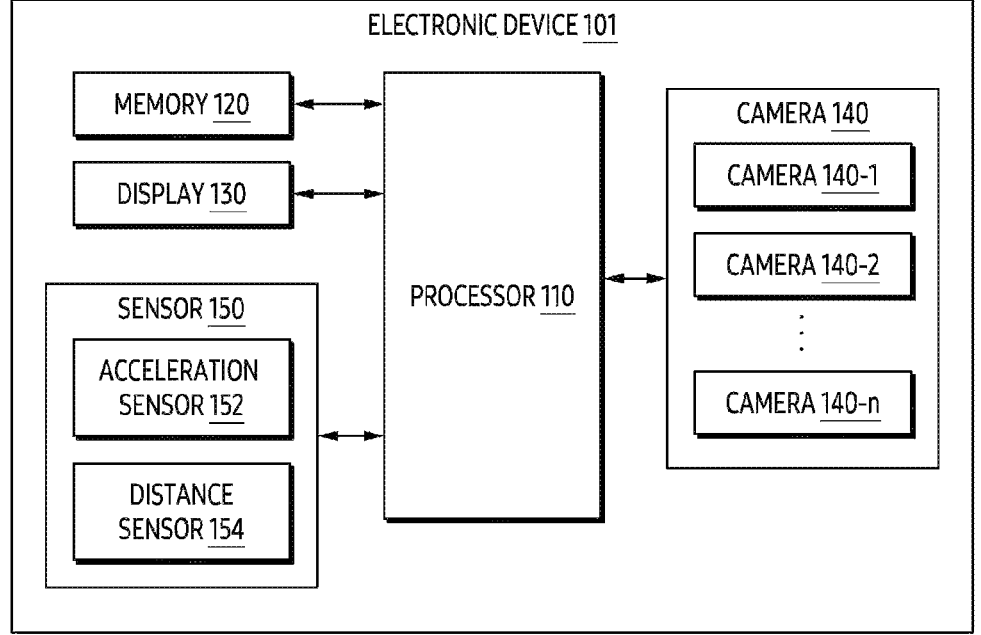
FIG. 1 is a block diagram of an example electronic device according to various embodiments.

Hereinafter, various example embodiments of the present document will be described with reference to the accompanying drawings.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all, possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to various embodiments, the module may be implemented in a form of an application-specific integrated circuit (ASIC).

FIG. 1 is a block diagram of an example electronic device 101 according to various embodiments. The electronic device 101 according to various embodiments may include at least one of a processor 110 (including, e.g., processing circuitry), a memory 120, a display 130, a camera 140, or a sensor 150. The processor 110, the memory 120, the display 130, the camera 140, and the sensor 150 may be electronically and/or operably coupled with each other by an electronic component such as e.g., a communication bus. The type and/or the number of hardware components included in the electronic device 101 are not limited to those shown in FIG. 1. For example, the electronic device 101 may include only some of the hardware components illustrated in FIG. 1. The electronic device 101 according to various embodiments may be a terminal owned by a user. The terminal may include, for example, a personal computer (PC) such as a laptop or a desktop, a smartphone, a smart pad, a tablet PC, a smartwatch, or smart accessories such as e.g., a head-mounted device (HMD).

The processor 110 of the electronic device 101 according to various embodiments may include a hardware component for processing data based on one or more instructions. The hardware component for processing data may include, for example, an arithmetic and logic unit (ALU), a field programmable gate array (FPGA), and/or a central processing unit (CPU). The processor 110 may include one or more processors. For example, the processor 110 may have a structure of a multi-core processor such as e.g., a dual-core, a quad-core, or a hexa-core.

The processor 110 according to various embodiments of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 120 of the electronic device 101 according to various embodiments may include a hardware component for storing data and/or instructions input and/or output to the processor 110. The memory 120 may include, for example, a volatile memory such as a random-access memory (RAM) and/or a non-volatile memory such as a read-only memory (ROM). The volatile memory may include, for example, at least one of dynamic RAM (DRAM), static RAM (SRAM), cache RAM, or pseudo SRAM (PSRAM). The non-volatile memory may include, for example, at least one of programmable ROM (PROM), erasable PROM (EPROM), electrically erasable PROM (EEPROM), flash memory, hard disk, compact disk, and embedded multi-media card (eMMC).

In the memory 120 of the electronic device 101 according to various embodiments may store at least one instruction indicating an operation to be performed by the processor 110 on any data. A set of instructions may be referred to as firmware, an operating system, a process, a routine, a sub-routine, and/or an application. For example, the processor 110 of the electronic device 101 may execute a set of a plurality of instructions distributed in the form of an application to perform an operation of the electronic device (e.g., at least one of operations of FIGS. 10 to 13) to be described below.

The display 130 of the electronic device 101 according to various embodiments may output visualized information (e.g., at least one of screens of FIGS. 2, 6A, and/or FIG. 8) to a user. Such visualized information may be generated, for example, by an application being executed by the processor 110 of the electronic device 101. For example, the display 130 may be controlled by a controller such as e.g., a graphic processing unit (GPU) included in the processor 110 or disposed in the electronic device 101 independently of the processor 110 to output the visualized information to a user. The display 130 may include a flat panel display (FPD) and/or an electronic paper. The FPD may include a liquid crystal display (LCD), a plasma display panel (PDP), and/or one or more light emitting diodes (LEDs). The LED may include an organic LED (OLED).

The camera 140 of the electronic device 101 according to various embodiments may include one or more optical sensors (e.g., a charged coupled device (CCD) sensor or a complementary metal oxide semiconductor (CMOS) sensor) to generate electrical signals representing a color and/or brightness of light. A plurality of optical sensors included in the camera 140 may be arranged in the form of a two-dimensional grid array. The camera 140 may substantially simultaneously obtain electrical signals from each of the plurality of optical sensors to generate an image corresponding to light reaching the optical sensors arranged in the two-dimensional grid array, including a plurality of pixels arranged in two dimensions. For example, photograph data captured using the camera 140 may refer to one image obtained from the camera 140. For example, the video data captured using the camera 140 may refer to a sequence of a plurality of images obtained at a designated frame rate from the camera 140. The electronic device 101 according to various embodiments may further include a flash disposed toward a direction that the camera 140 receives light, and for outputting light in the direction.

The number of cameras 140 included in the electronic device 101 according to various embodiments may be one or more. Referring to FIG. 1, the electronic device 101 may include n cameras (140-1, 140-2, ..., 140-n). The n cameras (140-1, 140-2, ..., 140-n) may respectively have an independent direction and/or Field-of-View (FOV) in the electronic device 101. The FOV may refer to an area that is formed based on a view angle of the lens of the camera 140 being capable of receiving light, and may correspond to an area corresponding to an image generated by the camera 140. The electronic device 101 according to various embodiments may substantially simultaneously control at least two of the n cameras (140-1, 140-2, ..., 140-n), at least portions of which have overlapping FOVs with each other, thereby obtaining at least two images from the at least two cameras. Various embodiments in which the n cameras (140-1, 140-2, ..., 140-n) are disposed in the electronic device 101 will be described below in further detail with reference to FIGS. 3A to 3B, 4A, 4B, and 4C, and/or 5A to 5B.

The sensor 150 of the electronic device 101 according to various embodiments may generate electrical information that may be processed by the processor 110 and/or the memory 120 from non-electric information related to the electronic device 101. The electrical information generated by the sensor 150 may be stored in the memory 120, processed by the processor 110, and/or transmitted to another electronic device distinct from the electronic device 101. For example, the sensor 150 may include a global positioning system (GPS) sensor for detecting a geographic location of the electronic device 101 and/or an illuminance sensor for measuring brightness of ambient light.

Referring to FIG. 1, the sensor 150 of the electronic device 101 according to various embodiments may include an acceleration sensor 152 for measuring a physical movement of the electronic device 101. The acceleration sensor 152 may output electrical information indicating a magnitude of gravitational acceleration measured along each of a plurality of designated axes (e.g., x-axis, y-axis, and z-axis) perpendicular to each other. The processor 110 of the electronic device 101 according to various embodiments may measure posture (or pose) of the electronic device 101 in a physical space, based on the electrical information output from the acceleration sensor 152. The posture measured by the electronic device 101 may indicate an orientation of the electronic device 101 measured by the sensor 152 and/or a form of the electronic device 101 (e.g., the shape of the electronic device 101 deformed by an external force to be described below in FIGS. 4A, 4B, and 4C). The form of the electronic device 101 may be measured, for example, by a hall sensor. The electronic device 101 may determine a mode of the electronic device 101 based on the measured posture. For example, the electronic device 101 may identify a mode corresponding to the posture of the electronic device 101, from among a plurality of designated modes inclusive of a landscape mode and a portrait mode.

For example, when a housing and/or the display 130 of the electronic device 101 have a width and a length, the landscape mode may include a state in which an angle between a direction of gravitational acceleration measured by the acceleration sensor 152 and a length direction of the electronic device 101 is included within a specified range including a right angle. In the above example, the portrait mode may include a state in which an angle between a direction of the gravitational acceleration measured by the acceleration sensor 152 and a width direction of the electronic device 101 is included within a specified range including a right angle. In various embodiments, the plurality of designated modes may further include, for example, a mode related to the form of the electronic device 101 deformed by an external force, as a different mode distinct from the above-described landscape mode and portrait mode. For example, the electronic device 101 may measure electrical information representing the form of the electronic device 101, using another sensor distinct from the acceleration sensor 152. An operation in which the electronic device 101 measures a posture of the electronic device 101 or/and determines a mode of the electronic device 101 according to various embodiments will be described in further detail below referring to FIGS. 3A to 3B, and/or 4A, 4B, and 4C.

The electronic device 101 according to various embodiments may operate based on the identified mode using the sensor 150 including the acceleration sensor 152. For example, the electronic device 101 may change a direction of a user interface (UI) output from the display 130. The electronic device 101 according to various embodiments may select at least two cameras from the n cameras (140-1, 140-2, . . . , 140-n), based on the mode of the electronic device 101. For example, the electronic device 101 may select, from the n cameras (140-1, 140-2, . . . , 140-n), two cameras having a disparity (e.g., the disparity corresponding to a binocular disparity, which is a difference caused between images formed onto each of two eyes of a person, by a distance between the two spaced eyes of the person). By simultaneously controlling the selected two cameras, the electronic device 101 may obtain two images having a disparity. An operation of obtaining the two images having a disparity by the electronic device 101 according to various embodiments will be described below with reference to FIGS. 3A to 3B, and/or 5A to 5B.

Referring to FIG. 1, the sensor 150 of the electronic device 101 according to various embodiments may include a distance sensor 154 for measuring a distance between the electronic device 101 and an external object distinct from the electronic device 101. The external object may include, for example, a subject included in the FOV of the camera 140 and included in the image obtained from the camera 140. The distance sensor 154 of the electronic device 101 according to various embodiments may correspond to a laser sensor for measuring a distance between the electronic device 101 and a subject, based on laser light. The distance measured by the laser sensor may be used for focus adjustment (e.g., autofocus) by the camera 140. The distance sensor 153 of the electronic device 101 according to various embodiments may correspond to a time-of-flight (ToF) sensor that generates a depth image including depth values arranged in two dimensions. The ToF sensor may include an infrared diode, and a plurality of infrared light sensors arranged in a two-dimensional grid pattern to detect intensity of infrared light. The electronic device 101 may use the ToF sensor to obtain the depth image based on a time at which light emitted from the infrared diode is reflected from a subject and then reaches at least one of the plurality of infrared light sensors.

The electronic device 101 according to various embodiments may process two images obtained from two simultaneously controlled cameras, using the distance between the subject measured by the distance sensor 154 and the electronic device 101. For example, the electronic device 101 may obtain one or more parameters for adjusting at least one of the distinct FOVs of the two images, based on the distance measured by the distance sensor 154. According to various embodiments, an example in which the electronic device 101 processes two images based on the distance measured by the distance sensor 154 will be described below with reference to FIGS. 6A, 6B, and 6C and/or 8.

Although not shown herein, the electronic device 101 according to various embodiments may include an output device (e.g., including an output circuit) for outputting information in a form other than the visualized form. For example, the electronic device 101 may include a speaker for outputting an acoustic signal. For example, the electronic device 101 may include a motor for providing haptic feedback based on vibration.

In order to obtain two images having a disparity, the electronic device 101 according to various embodiments may simultaneously control at least two cameras of n cameras (140-1, 140-2, . . . 140-n) included in the electronic device 101, based on a single shooting (capture) input received from a user. According to various embodiments, an example of a UI displayed on the display 130 by the electronic device 101 to receive a shooting input from a user will be described below with reference to FIGS. 2 and/or 8. For example, the electronic device 101 may simultaneously control the two cameras to obtain two images substantially simultaneously from each of the two cameras. The electronic device 101 may obtain another image for providing an animation in which the two images are alternately displayed, by concatenating the two obtained images to each other. Hereinafter, the concatenating the two images by the electronic device 101 may, for example, include combining the two images such that the two images are displayed consecutively in a time domain. The operation of concatenating the obtained two images by the electronic device 101 according to various embodiments will be described below with reference to FIGS. 6A, 6B, and 6C, 7, 8, and/or 9.

As described above, the electronic device 101 according to various embodiments may simultaneously control a plurality of cameras having FOVs having a subject in common to simultaneously obtain a plurality of images having a disparity, in response to receiving a shooting input from a user once. Independently of the user moving the electronic device 101 or the user performing a plurality of shooting inputs, the electronic device 101 may simultaneously obtain a plurality of images having a disparity. The electronic device 101 according to various embodiments may generate an animation in which a plurality of images having a disparity are alternately displayed by, for example, concatenating the plurality of images having a disparity. The animation may provide the user with a three-dimensional effect generated by the plurality of images due to the disparity. Since the plurality of images used to generate the animation are obtained by a single shooting input, the electronic device 101 may generate another image for providing the animation that provides a three-dimensional effect to a user with a single shooting input.

Hereinafter, an example UI displayed on the display 130 by the electronic device 101 according to various embodiments to generate an animation having a three-dimensional effect will be described with reference to FIG. 2.

Figure 2:
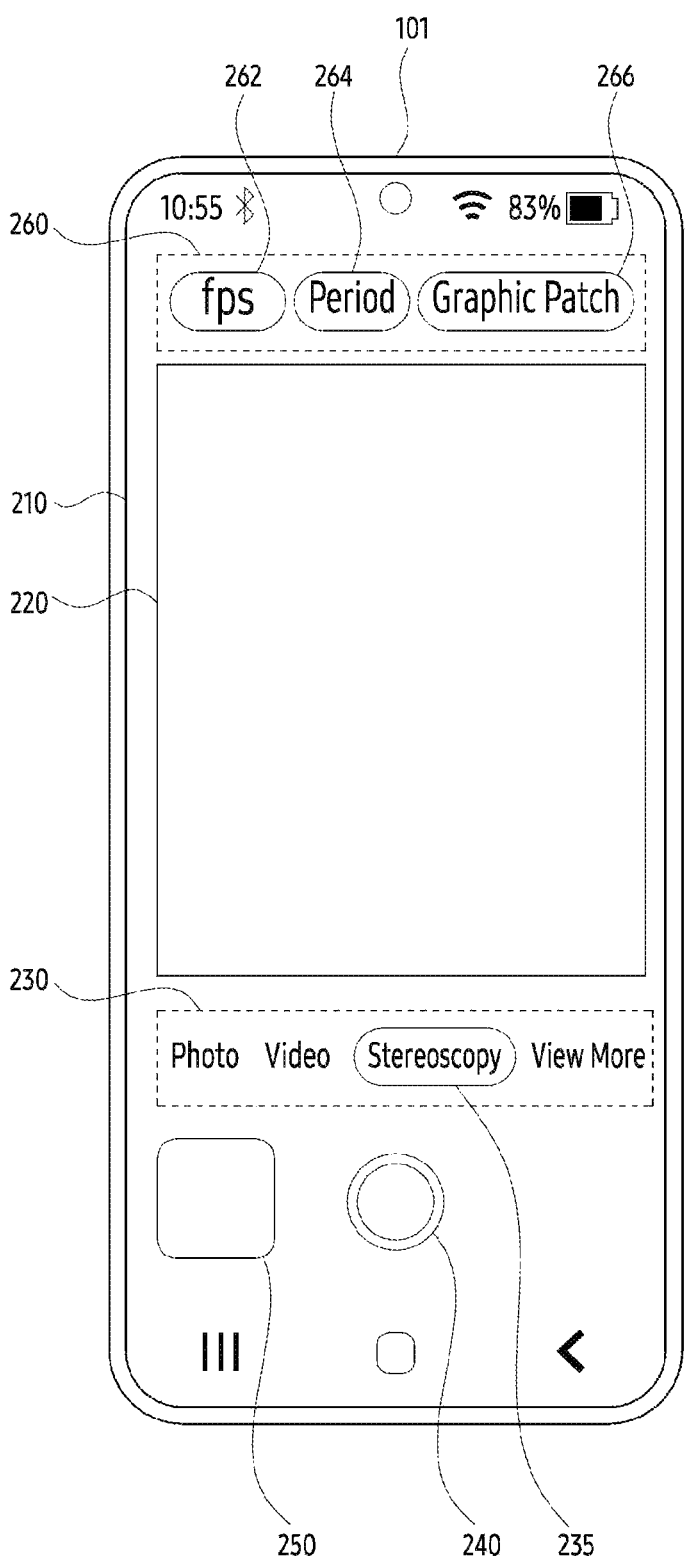
FIG. 2 is a diagram illustrating an example user interface (UI) displayed by an example electronic device according to various embodiments.

FIG. 2 is a diagram illustrating an example user interface (UI) displayed by an electronic device 101 according to various embodiments. The electronic device 101 of FIG. 2 may correspond to an example of the electronic device 101 of FIG. 1. Referring to FIG. 2, an example of a screen 210 displayed by the electronic device 101 on a display (e.g., the display 130 of FIG. 1) is illustrated. Hereinafter, the screen 210 may refer, for example, to a UI displayed within at least a portion of the display. The screen 210 may include, for example, an activity of an Android operating system. The screen 210 of FIG. 2 may be displayed by an electronic device 101 executing an application (e.g., a camera application) stored in a memory (e.g., the memory 120 of FIG. 1).

Referring to FIG. 2, the electronic device 101 may display a preview image 220 provided from a camera (e.g., the camera 140-1 of FIG. 1) included in the electronic device 101 on the screen 210. When the electronic device 101 includes a plurality of cameras, the electronic device 101 may display the preview image 220 based on at least a portion of a plurality of images obtained through any one of the plurality of cameras. For example, a resolution and/or a dimension of the preview image 220 may be less than the resolution and/or the size of each of the plurality of images.

The electronic device 101 according to various embodiments may display visual objects for performing different functions related to the camera included in the electronic device 101, in a state of displaying the preview image 220 on the screen 210. For example, the electronic device 101 may display a menu indicating a type of content to be obtained using a camera based on text and/or an icon, on a portion 230 of the screen 210. Referring to FIG. 2, the electronic device 101 may display, on the portion 230, texts representing each of a photograph, a video, and/or a stereoscopy, as contents that may be obtained using the camera. In response to identifying a user input of touching and/or clicking on text 235 corresponding to a stereoscopy on the portion 230, the electronic device 101 may enter a state for obtaining an image for generating an animation having a stereoscopic effect. The animation may include, for example, a wiggle stereoscopy, which demonstrates a repetitive movement along a horizontal direction with respect to a particular subject.

The electronic device 101 according to various embodiments may display text and/or icons for controlling one or more parameters related to the type of content selected from the portion 230, in a portion 260 distinct from the portion 230 in the screen 210. In a state for obtaining an image for generating an animation having a three-dimensional effect, the electronic device 101 may display, in the portion 260, at least one of text (e.g., frames per second (fps) 262) for adjusting a frame rate of the animation, text 264 for adjusting a period of the animation, or text 266 for patching a graphic object generated by the electronic device 101, which is distinguished from one or more subjects photographed by the camera of the electronic device 101.

The direction of the text and/or icon displayed on the screen 210 by the electronic device 101 according to various embodiments may be determined based on a mode selected from a plurality of designated modes according to a posture of the electronic device 101. For example, in the portrait mode, the electronic device 101 may display the direction of the text displayed on the screen 210 along a direction parallel to the width direction of the screen 210 as shown in FIG. 2. When it is switched from the portrait mode to the landscape mode as the user tilts the electronic device 101, the electronic device 101 may display the direction of the text displayed on the screen 210 along a direction perpendicular to the width direction of the screen 210, unlike FIG. 2. The direction of the text displayed by the electronic device 101 in the landscape mode according to various embodiments may include the direction of the texts shown in FIG. 6A.

The electronic device 101 according to various embodiments may display an icon 240 for receiving a shooting input on the screen 210. In response to identifying a user input of touching and/or clicking the icon 240, the electronic device 101 may obtain an image from one or more cameras. Hereinafter, the shooting input may include, for example, a user input of touching and/or clicking the icon 240, as a user input for generating the content of the type selected by the portion 230. For example, after identifying a user input of touching and/or clicking the text 235 corresponding to stereoscopy, in response to receiving the shooting input, the electronic device 101 may control at least two cameras substantially at the same time to obtain at least two images for playing an animation having a stereoscopic effect from the at least two cameras.

The electronic device 101 may generate another image for providing an animation having a three-dimensional effect, using at least two obtained images. The other image may have a frame rate based at least on a user input related to the text 262. The other image may have a period based at least on a user input related to the text 264. The period may correspond to a length of a time interval over which two images obtained by the electronic device 101 are displayed in an alternating manner. The other image may further include a graphic object based at least on a user input related to the text 266. The other image for providing an animation having a three-dimensional effect may correspond to, for example, a file in the format based on GIF (Graphics Interchange Format) and/or MP4 (MPEG-4). The electronic device 101 according to various embodiments may display, in a portion 250 of the screen 210, a thumbnail corresponding to a content stored in the electronic device 101 (e.g., the latest content photographed using a camera of the electronic device 101). For example, after the electronic device 101 generates the other image for providing an animation having a three-dimensional effect, the electronic device 101 may display a thumbnail representing the other image in the portion 250. For example, the thumbnail may include an image representing at least a portion of one moment of an animation displayed by the other image.

As described above, the electronic device 101 according to various embodiments may display the screen 210 for controlling at least two cameras among a plurality of cameras included in the electronic device 101. In response to receiving a user input (e.g., the shooting input related to the icon 240) performed based on the screen 210, the electronic device 101 may generate an animation having a three-dimensional effect using the at least two cameras.

Hereinafter, an example operation of selecting at least two cameras from among a plurality of cameras by the electronic device 101 according to various embodiments will be described in detail with reference to FIGS. 3A to 3B.

Figure 3A:
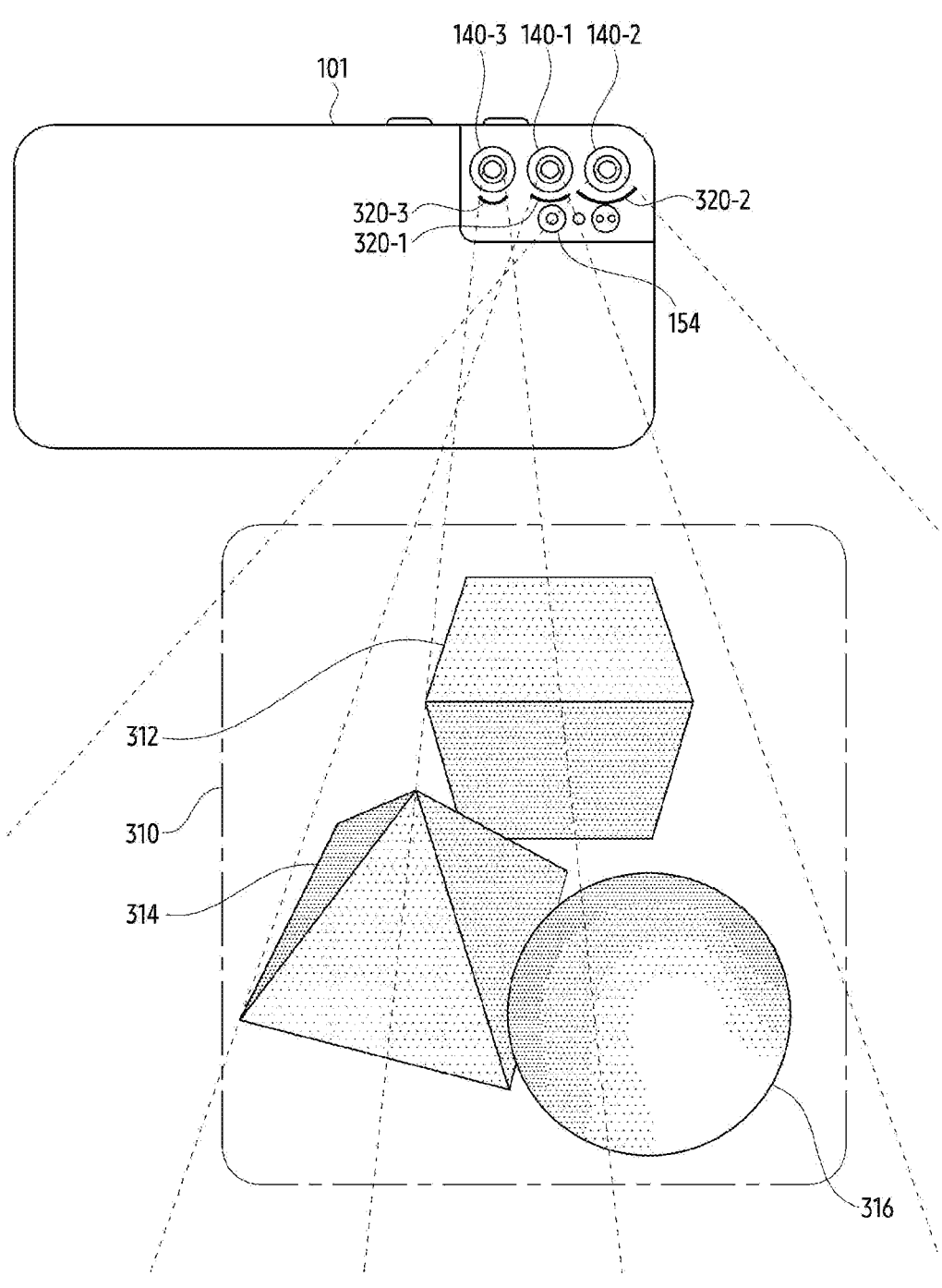
FIGS. 3A and 3B are diagrams for explaining an example operation in which an example electronic device selects at least two cameras from among a plurality of cameras, according to various embodiments.
Figure 3B:
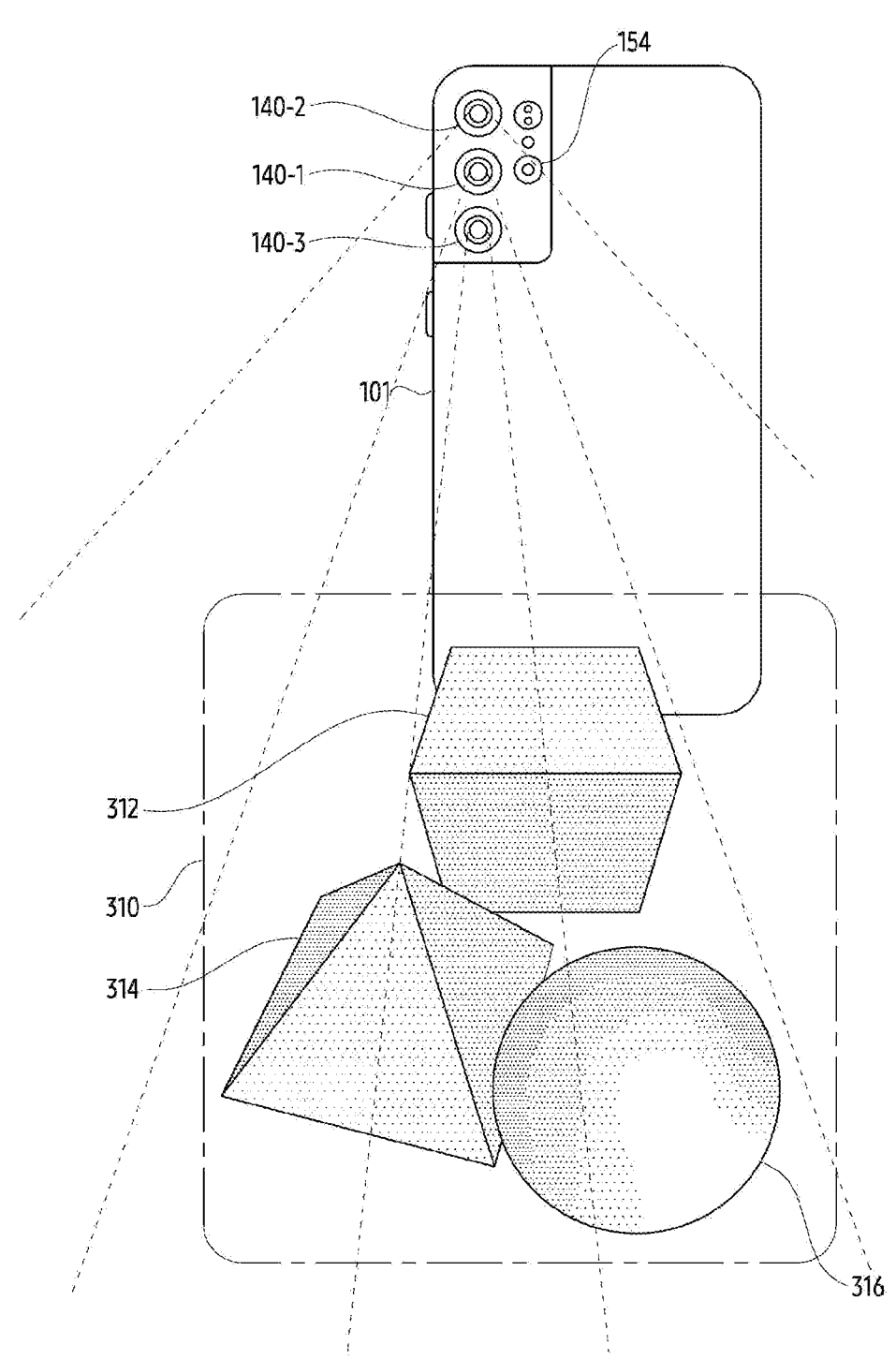

FIGS. 3A to 3B are diagrams for explaining an example operation in which the electronic device 101 selects at least two cameras from among a plurality of cameras according to various embodiments. The electronic devices 101 of FIGS. 3A to 3B may correspond to an example of the electronic device 101 of FIG. 1 or 2.

Referring to FIG. 3A, a state 300 is shown in which the electronic device 101 in a landscape mode is disposed toward a subject 310. Lenses included in each of a plurality of cameras (140-1, 140-2, 140-3) included in the electronic device 101 according to various embodiments may be exposed to the outside through a second surface distinct from a first surface where at least a portion of the display 130 of FIG. 1 is exposed to the outside. The distance sensor 154 included in the electronic device 101 according to various embodiments may be exposed to the outside through the second surface on which the lenses are exposed to the outside.

A plurality of cameras (140-1, 140-2, 140-3) included in the electronic device 101 according to various embodiments may have FOVs distinct from each other. The distance sensor 154 may obtain a distance between the electronic device 101 and the subject 310 included in at least a portion of the FOVs. Referring to FIG. 3A, angles of view (320-1, 320-2, 320-3) related to each of the FOVs of the plurality of cameras (140-1, 140-2, 140-3) are illustrated. For example, the camera 140-1 is a camera that generates a plurality of images for obtaining a preview image (e.g., the preview image 220 of FIG. 2), and may have an angle of view 320-1 corresponding to a specified angle. For example, the camera 140-2 may have an angle of view 320-2 corresponding to an angle greater than the specified angle. For example, when the camera 140-1 is referred to as a wide-angle camera, the camera 140-2 may be referred to as an ultra-wide-angle camera. For example, the camera 140-3 may have an angle of view 320-3 corresponding to an angle less than the specified angle. For example, the camera 140-3 may be referred to as a telephoto camera for photographing a subject located relatively far from the electronic device 101. The type and/or the number of cameras (140-1, 140-2, 140-3) exposed to the outside through the second surface of the electronic device 101 are not limited to the example shown in FIG. 3A.

Referring to FIG. 3A, at least a portion of the FOVs of each of the cameras (140-1, 140-2, 140-3) indicated by the angles of view (320-1, 320-2, 320-3) may overlap each other. As the cameras (140-1, 140-2, 140-3) are disposed to be spaced apart from each other on the second surface of the electronic device 101, a disparity may occur in an overlapping portion of the FOVs. In the state 300 of FIG. 3A, a subject 312 corresponding to a cuboid, a subject 314 corresponding to a pyramid, and a subject 316 corresponding to a sphere may be included in all of the FOVs of the cameras 140-1 and 140-2. In this case, as the images obtained by each of the cameras 140-1 and 140-2 include visual objects corresponding to the shapes of the subjects (312, 314, 316) photographed at different angles, a disparity may occur in the images. In the state 300 corresponding to the landscape mode, as the cameras 140-1 and 140-2 are horizontally separated, the images obtained by each of the cameras 140-1 and 140-2 may have a disparity related to binocular disparity.

The electronic device 101 according to various embodiments may generate an animation that provides a three-dimensional effect related to subjects (312, 314, 316) disposed on overlapping portions of FOVs of a plurality of cameras 140-1 and 140-2 included in the electronic device 101. The animation may be, for example, an animation obtained by simultaneously controlling the plurality of cameras 140-1 and 140-2, with two images obtained from each of the plurality of cameras 140-1 and 140-2 being played back in an alternate manner. The electronic device 101 according to various embodiments may select at least two cameras (e.g., the cameras 140-1 and 140-2) from among the plurality of cameras (140-1, 140-2, 140-3) in order to obtain at least two images used for generating an animation having a three-dimensional effect. The selecting of the at least two cameras by the electronic device 101 may be performed according to a specified combination based at least on the mode of the electronic device 101. The specified combination may be determined based on at least one of a distance between lenses of a plurality of cameras (140-1, 140-2, 140-3) included in the electronic device 101, FOVs of a plurality of cameras (140-1, 140-2, 140-3), or the mode of the electronic device 101.

According to various embodiments, the selecting of at least two cameras used for generating of the animation from among a plurality of cameras (140-1, 140-2, 140-3) by the electronic device 101 may be performed based on at least one of receiving a shooting input and/or identifying the mode of the electronic device 101. For example, in response to receiving a shooting input from a user, the electronic device 101 may select another camera to be controlled simultaneously with the camera 140-1 displaying the preview image, from among the plurality of cameras (140-1, 140-2, 140-3). Referring to FIG. 3A, the electronic device 101 may select, from among the plurality of cameras (140-1, 140-2, 140-3), two cameras 140-1 and 140-2 distinguished from the telephoto camera 140-3, as cameras used for generating of the animation. The electronic device 101 according to various embodiments may obtain two images to be used for generating the animation, using the two selected cameras 140-1 and 140-2. At substantially the same time as obtaining the two images, the electronic device 101 may control the distance sensor 154 to identify a distance between at least one of the subjects (312, 314, 316) included in the two images and the electronic device 101. The identified distance may be used to align the two obtained images. According to various embodiments, an operation of the electronic device 101 of aligning the two obtained images using the distance identified by the distance sensor 154 will be described below with reference to FIGS. 6A, 6B and 6C.

Referring to FIG. 3B, a state 305 is shown in which the electronic device 101 in the portrait mode is disposed toward the subject 310. Referring to FIG. 3B, as the cameras (140-1, 140-2, 140-3) are vertically separated from each other in the state 305 corresponding to the portrait mode, the images obtained by each of the cameras (140-1, 140-2, 140-3) may have a disparity distinct from binocular disparity. In order to enhance the three-dimensional effect provided by the animation by generating an animation having a disparity corresponding to binocular disparity, in the portrait mode, the electronic device 101 according to various embodiments may output, to the user, a message including an image and/or a voice for switching from the portrait mode to the landscape mode. The disclosure is not limited in this respect, and the electronic device 101 may simultaneously control at least two cameras (e.g., the cameras 140-1 and 140-2) in the state 305 to obtain two images for providing an animation having a three-dimensional effect.

As described above, in order to generate an animation having a three-dimensional effect, the electronic device 101 according to an embodiment may select at least two cameras (e.g., the cameras 140-1 and 140-2) having FOVs overlapping each other, as cameras to obtain at least two images required to generate the animation. The electronic device 101 may, for example, simultaneously control the at least two selected cameras based on a single shooting input, thereby generating the animation with only a single shooting input.

Hereinafter, in various embodiments of the electronic device 101 having a form factor distinct from FIGS. 3A to 3B, an operation of selecting at least two cameras having FOVs overlapping each other will be described in detail with reference to FIGS. 4A, 4B, and 4C, and/or 5A to 5B.

Figure 4A:
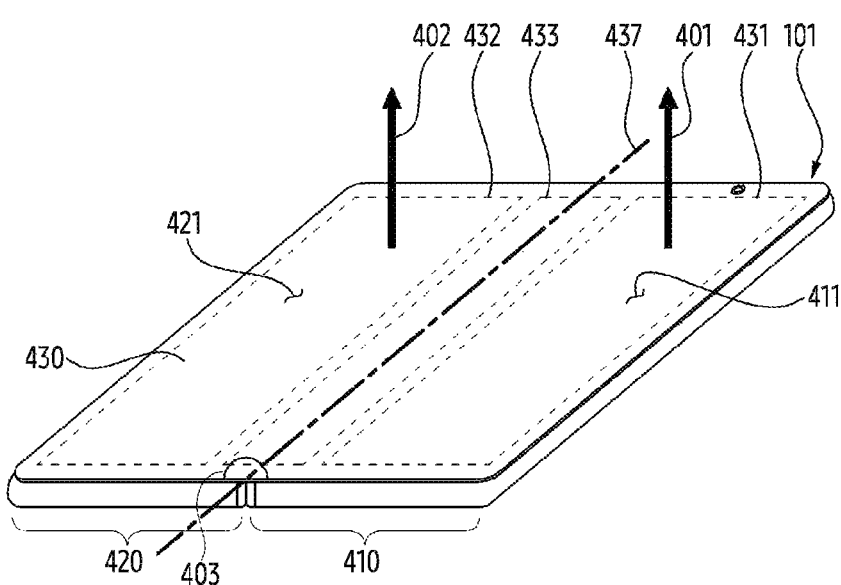
FIGS. 4A, 4B, and 4C are diagrams for explaining example structures of an example electronic device that is deformable by an external force according to various embodiments.
Figure 4B:
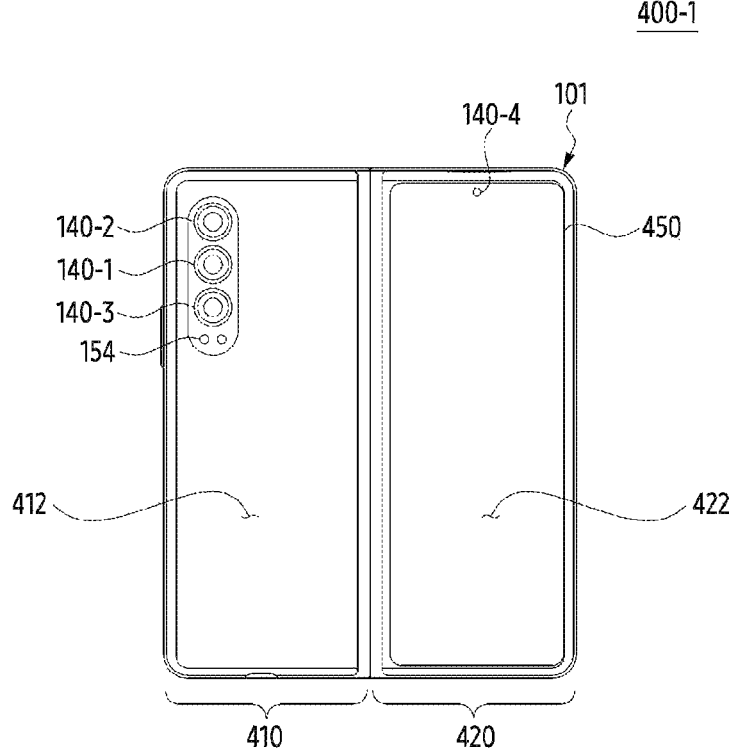
Figure 4C:
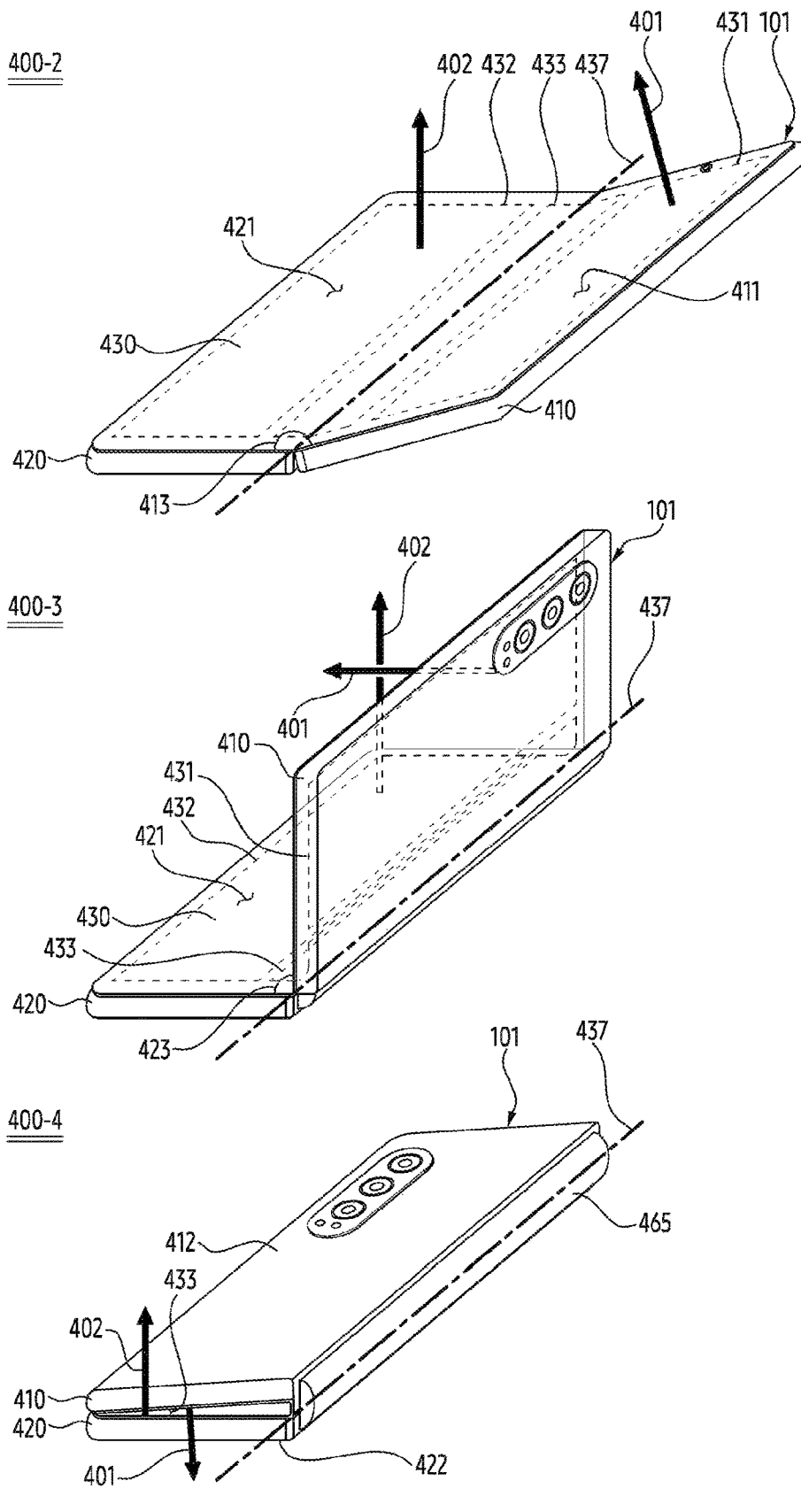

FIGS. 4A, 4B and 4C are diagrams illustrating the structure of an example electronic device 101 deformable by an external force. The electronic device 101 of FIGS. 4A, 4B and 4C may correspond to an example of the electronic device 101 of FIG. 1 or 2.

The electronic device 101 according to various embodiments may have a form factor deformable by an external force. Referring to FIG. 4A, the electronic device 101 may include a first housing 410 and a second housing 420 connected through a folding housing (e.g., a folding housing 465 of FIG. 4C). The first housing 410 and the second housing 420 may be coupled to the folding housing to be rotatable about a rotation shaft 437 included in the folding housing. FIG. 4A is a diagram illustrating the electronic device 101 in a state 400-1 corresponding to an unfolding mode in which the first housing 410 and the second housing 420 are fully folded out by the folding housing.

In various embodiments, the state 400-1 may refer, for example, to a state in which a first direction 401 in which the first surface 411 of the first housing 410 faces corresponds to a second direction 402 in which the first surface 421 of the second housing 420 faces. For example, in the state 400-1, the first direction 401 may be parallel to the second direction 402. For example, in the state 400-1, the first direction 401 may be substantially the same as the second direction 402. In various embodiments, in the state 400-1, the first surface 411 of the first housing 410 may form substantially one plane with the first surface 421 of the second housing 420. In various embodiments, in the state 400-1, an angle 403 between the first surface 411 of the first housing 410 and the first surface 421 of the second housing 420 in the state 400-1 may be substantially 180 degrees.

The electronic device 101 according to various embodiments may include a flexible display 430 crossing a plurality of housings. For example, the flexible display 430 may correspond to an example of the display 130 of FIG. 1. Referring to FIG. 4A, the flexible display 430 may be disposed on the first surface 411 of the first housing 410 and the first surface 421 of the second housing 420. A display area of the flexible display 430 may include a first display area 431 corresponding to the first surface 411 of the first housing 410, a second display area 432 corresponding to the first surface 421 of the second housing 420, and a third display area 433 between the first display area 431 and the second display area 432. The shape of the third display area 433 may alter by a change in the first direction 401 and the second direction 402 by the folding housing.

In various embodiments, the state 400-1 may refer, for example, to a state in which the entire display area of the flexible display 430 may be provided on substantially one plane. For example, the state 400-1 may refer, for example, to a state in which all of the first display area 431, the second display area 432, and the third display area 433 may be provided on one plane. For example, in the state 400-1, the third display area 433 may not include a curved surface. In various embodiments, the unfolding mode may be also referred to as a spreading state (an outspread or outspreading state) and/or a spreading mode.

FIG. 4B is a diagram illustrating other surfaces of the electronic device 101 distinct from the first surface 411 of the first housing 410 and the first surface 421 of the second housing 420 shown in FIG. 4A, in the unfolding mode of state 400-1. Referring to FIG. 4B, a second surface 412 of the first housing 410 corresponds to a rear surface of the first surface 411 of the first housing 410, and the second surface 422 of the second housing 420 corresponds to a rear surface of the first surface 421 of the second housing 420.

Referring to FIG. 4B, the electronic device 101 according to various embodiments may include a display 450 viewed through the second surface 422 of the second housing 20. The display 450 may be independently controlled from the flexible display 430 by the electronic device 101. The electronic device 101 according to various embodiments may display the screen 210 of FIG. 2 on at least one of the display 450 and/or the flexible display 430. Referring to FIG. 4B, the electronic device 101 according to various embodiments may include a camera 140-4 disposed on the second surface 422 of the second housing 420. The camera 140-4 may be exposed to the outside through a perforated portion of the display 450. The electronic device 101 according to various embodiments may include a plurality of cameras (140-1, 140-2, 140-3) and a distance sensor 154 disposed on the second surface 412 of the first housing 410. The plurality of cameras (140-1, 140-2, 140-3) and the distance sensor 154 may correspond to each of the plurality of cameras (140-1, 140-2, 140-3) and the distance sensor 154 of FIG. 3A or 3B.

Referring to FIG. 4B, in a state 400-1 corresponding to the unfolding mode, a plurality of cameras (140-1, 140-2, 140-3, 140-4) may be arranged to be spaced apart in different directions. For example, when the cameras (140-1, 140-2, 140-3) are arranged to be spaced apart in the first direction, the cameras 140-4 may be spaced apart from the cameras (140-1, 140-2, 140-3) in a different direction substantially perpendicular to the first direction. The electronic device 101 according to various embodiments may select at least two cameras to be controlled to generate an animation, based on the positions of a plurality of cameras (140-1, 140-2, 140-3, 140-4) arranged to be spaced apart from each other in different directions, with FOVs overlapping each other. According to various embodiments, an operation of selecting at least two cameras by the electronic device 101 in the state 400-1 will be described below with reference to FIG. 5B.

In various embodiments, the electronic device 101 may operate in a folding mode in which the first housing 410 and the second housing 420 are folded in by the folding housing 465. FIG. 4C is a diagram illustrating an electronic device 101 in each of various states (400-2, 400-3, 400-4) included in the folding mode. Referring to FIG. 4C, the electronic device 101 may be in the folding mode including the states (400-2, 400-3, 400-4). In various embodiments, the folding mode including the states (400-2, 400-3, 400-4) may refer, for example, to a state in which the first direction 401 in which the first surface 411 of the first housing 410 faces is distinct from the second direction 402 in which the first surface 421 of the second housing 420 faces. For example, in the state 400-2, an angle between the first direction 401 and the second direction 402 is substantially 45 degrees, so the first direction 401 and the second direction 402 are distinguished from each other; in the state 400-3, the angle between the first direction 401 and the second direction 402 is substantially 90 degrees, so the first direction 401 and the second direction 402 are distinct from each other; and in the state 400-4, the angle between the first direction 401 and the second direction 402 is substantially 180 degrees, so the first direction 401 and the second direction 402 are distinct from each other. In various embodiments, the angle between the first surface 411 and the first surface 421 in the folding mode may be greater than or equal to 0 degrees and less than or equal to 180 degrees. For example, in the state 400-2, the angle 413 between the first surface 411 and the first surface 421 may be substantially 135 degrees; in the state 400-3, the angle 423 between the first surface 411 and the first surface 421 may be substantially 90 degrees; and in the state 400-4, the angle 433 between the first surface 411 and the first surface 421 may be substantially 0 degrees. In various embodiments, the folding mode may, for example, be referred to as a folded state and/or a folded mode.

In various embodiments, the folding mode may include a plurality of sub-folding modes, as opposed to the unfolding mode. For example, referring to FIG. 4C, the folding mode may include a plurality of sub-folding modes, including the state 400-4 that is a fully folding mode in which the first surface 411 substantially overlaps the first surface 421 by rotation provided through the folding housing 465, and the state 400-2 and the state 400-3 that are an intermediate mode between the state 400-4 and the unfolding modes (e.g., the state 400-1 of FIGS. 4A and 4B). For example, the electronic device 101 may provide the state 400-4 in which the entire area of the first display area 431 substantially fully overlaps the entire area of the second display area 432, as the first surface 411 and the first surface 421 face each other by the folding housing 465. For example, the electronic device 101 may provide the state 400-4 in which the first direction 401 is substantially opposite to the second direction 402. As another example, the state 400-4 may refer, for example, to a state in which the flexible display 430 is covered within the user's view looking at the electronic device 101. However, the present disclosure is not limited in this respect.

In various embodiments embodiment, the flexible display 430 may be bent by rotation provided through the folding housing 465. For example, in the flexible display 430, the third display area 433 may be bent according to a folding operation, unlike the first display area 431 and the second display area 432. For example, the third display area 433 may be in a curved state to prevent damage to the flexible display 430 in the fully folding mode. In the fully folding mode, the entirety of the first display area 431 may fully overlap the entirety of the second display area 432, as opposed to the third display area 433 being curved.

The electronic device 101 according to various embodiments may include a sensor for measuring an angle between the first housing 410 and the second housing 420 rotating about the folding housing 465 and/or the rotation shaft 437. Based on the angle between the first housing 410 and the second housing 420, the electronic device 101 may identify a state of the electronic device 101 corresponding to the angle from among the folding mode and the unfolding mode. Based on the identified state of the electronic device 101, the electronic device 101 may selectively activate and/or deactivate at least one of the flexible display 430 and/or the display 450. Based on the identified state of the electronic device 101, the electronic device 101 may simultaneously control at least two of the plurality of cameras (140-1, 140-2, 140-3, 140-4) to obtain at least two images having a disparity. The state of the electronic device 101 selected from the folding mode and the unfolding mode, which is a state related to the posture of the electronic device 101, may correspond to any one of the designated modes of the electronic device 101 that the electronic device 101 identifies to select the at least two cameras.

Meanwhile, each of FIGS. 4A, 4B, and 4C illustrates an example in which the flexible display 430 of the electronic device 101 includes one folding display area (e.g., the third display area 433) or the electronic device 101 includes one folding housing (e.g., the folding housing 465), but this is only for convenience of description. According to embodiments, the flexible display 430 of the electronic device 101 may include a plurality of folding display areas. For example, the flexible display 430 of the electronic device 101 may include two or more folding display areas, and the electronic device 101 may include two or more folding housings for providing the two or more folding display areas, respectively.

Hereinafter, referring to FIGS. 5A and 5B, in a state in which the posture of the electronic device 101 corresponds to each of the folding mode and the unfolding mode described above in FIGS. 4A, 4B, and 4C, an operation of the electronic device 101 according to various embodiments identifying at least two cameras to be controlled substantially simultaneously to generate an animation among a plurality of cameras will be described.

Figure 5A:
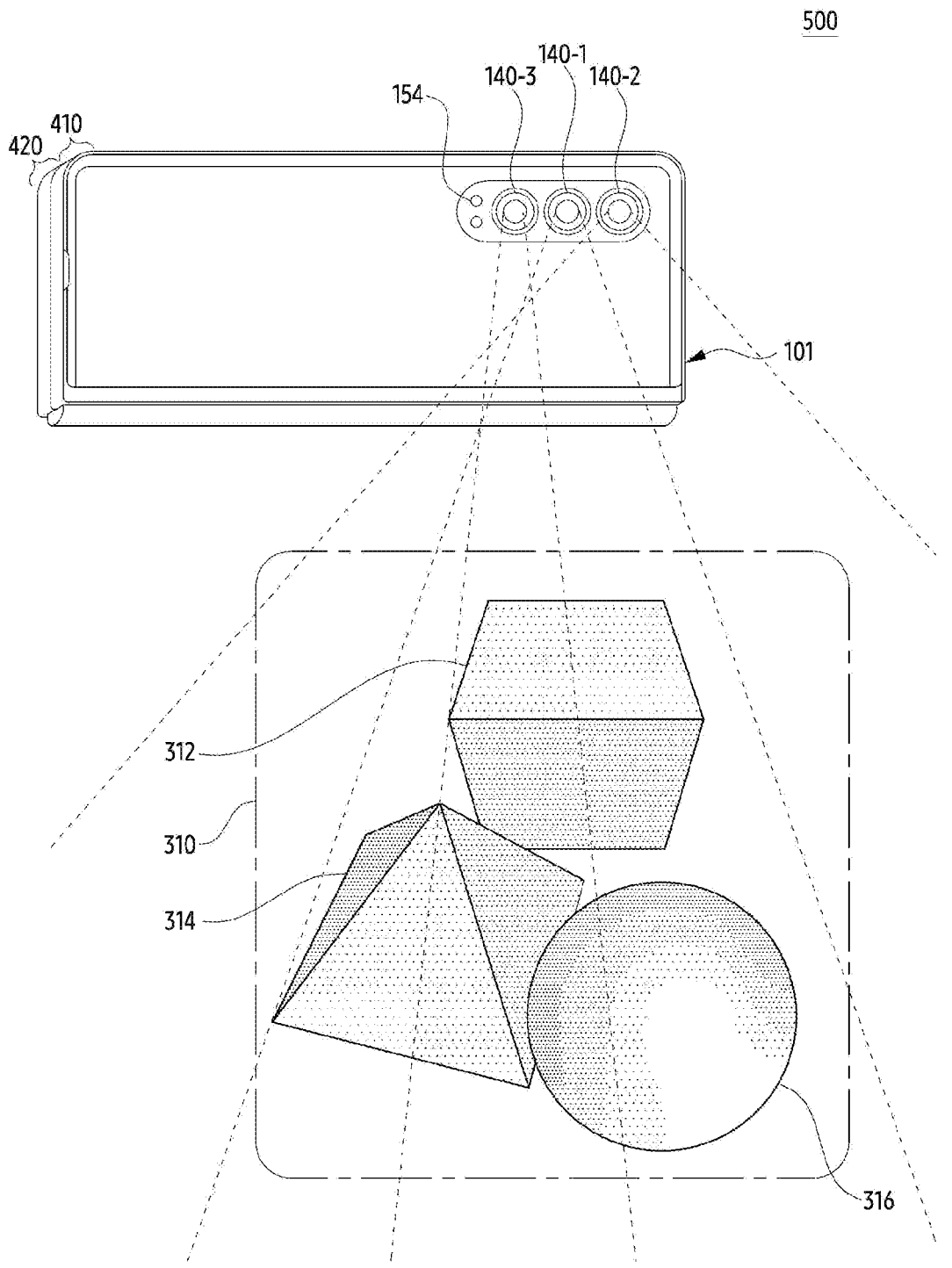
FIGS. 5A and 5B are diagrams illustrating an example operation in which an example electronic device selects at least one camera from among a plurality of cameras, according to example embodiments of FIGS. 4A, 4B, and 4C.
Figure 5B:
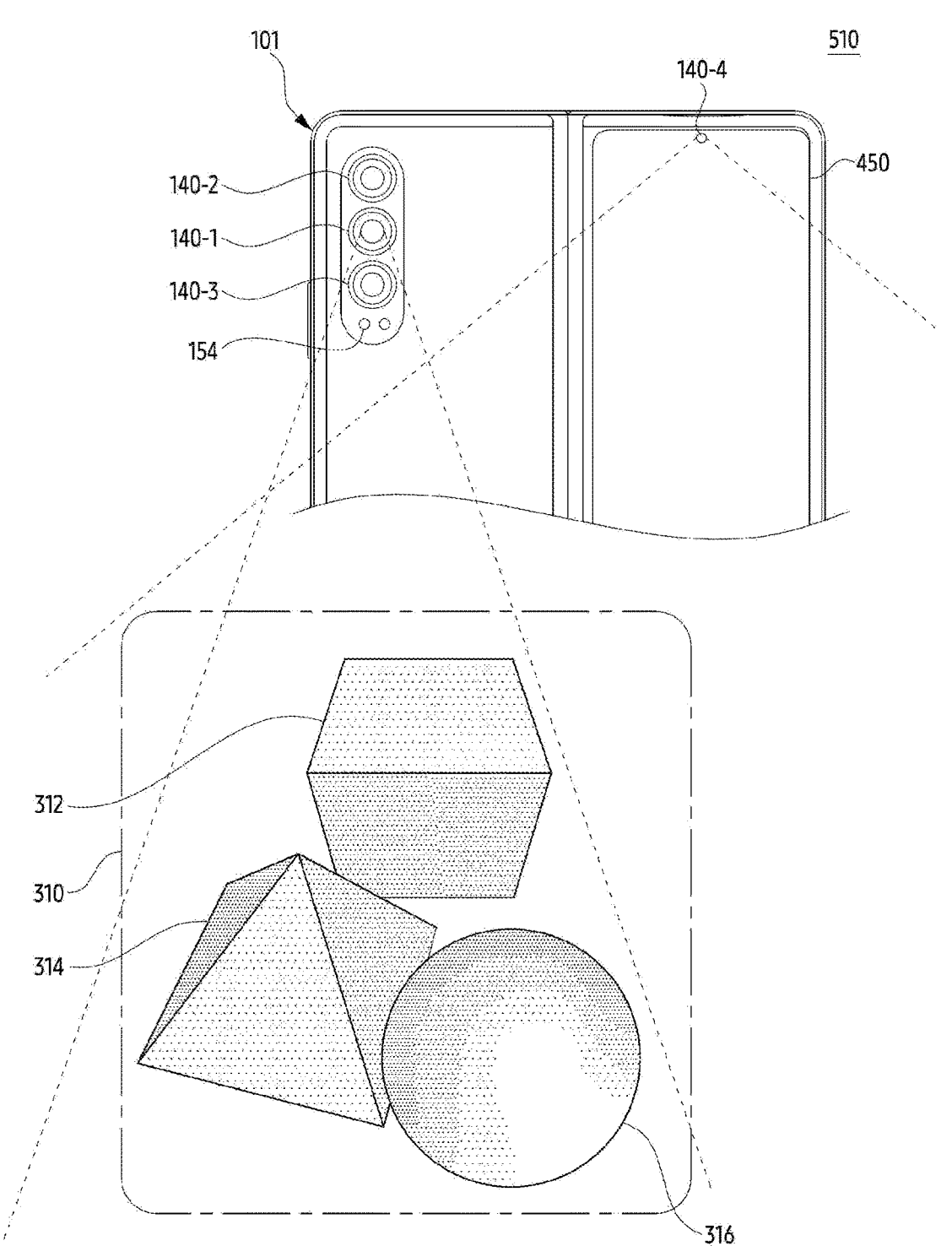

FIGS. 5A and 5B are diagrams illustrating an example operation of the electronic device 101 selecting at least one camera from among a plurality of cameras (140-1, 140-2, 140-3, 140-4), according to various embodiments of FIGS. 4A, 4B, and 4C.

Referring to FIG. 5A, a state 500 is shown corresponding to the unfolding mode, in which the electronic device 101 in the landscape mode is disposed toward the subject 310. The state 500 may correspond to a folding mode in which the first housing 410 and the second housing 420 of the electronic device 101 are substantially parallel to each other. The electronic device 101 according to various embodiments may identify a plurality of cameras to photograph the subject 310 in response to a shooting input, based on a mode corresponding to the posture of the electronic device 101 among a plurality of designated modes. In the electronic device 101 according to various embodiments of FIGS. 4A, 4B and 4C, the designated modes may be differentiated between a landscape mode and a portrait mode, as well as between an unfolding mode and a folding mode.

Referring to FIGS. 4C and 5A, in the state 400-4 corresponding to the state 500 and other states 400-2 and 400-3 included in the folding mode, FOVs of the cameras (140-1, 140-2, 140-3) among the cameras (140-1, 140-2, 140-3, 140-4) of FIGS. 4A to 4C may overlap each other. In this case, similar to FIG. 3A, the electronic device 101 according to various embodiments may simultaneously control two cameras 140-1 and 140-2 distinct from the camera 140-3, which is a telephoto camera, in response to receiving a single shooting input. The electronic device 101, together with the two cameras 140-1 and 140-2, may control the distance sensor 154 substantially at the same time to identify a distance between any one of the subjects (312, 314, 316) and the electronic device 101. The electronic device 101 may generate an animation having a disparity, based on two images obtained from two simultaneously controlled cameras 140-1 and 140-2, having a disparity related to the subject 310, and the distance identified by the distance sensor 154.

Referring to FIG. 5B, a state 510 is shown corresponding to the unfolding mode, in which the electronic device 101 in the portrait mode is disposed toward the subject 310. The state 510 may correspond to the states 400-1 of FIGS. 4A and 4B, and may correspond to an unfolding mode in which the first housing 410 and the second housing 420 of the electronic device 101 substantially form one plane. The electronic device 101 according to various embodiments may select at least two cameras to be used for generating an animation for providing a three-dimensional effect from among a plurality of cameras (140-1, 140-2, 140-3, 140-4), based on the portrait mode and the unfolding mode.

In the state 510 of FIG. 5B, FOVs of a plurality of cameras (140-1, 140-2, 140-3, 140-4) included in the electronic device 101 may overlap each other, independently of the state 500 in which FOVs of the cameras (140-1, 140-2, 140-3) among the cameras (140-1, 140-2, 140-3, 140-4) overlap each other. In this case, the electronic device 101 may select the farthest spaced cameras as cameras to be used for generating an animation for providing a three-dimensional effect, thereby increasing a disparity based on a distance between the cameras. As the disparity increases, the three-dimensional effect of the animation generated by the electronic device 101 may be further enhanced.

Referring to FIG. 5B, in the state 510 corresponding to the portrait mode and the unfolding mode, the electronic device 101 may select the camera 140-1 activated for displaying the preview image from among the plurality of cameras (140-1, 140-2, 140-3, 140-4), and the camera 140-4 disposed farthest from the camera 140-1, having a disparity with respect to the preview image, from among the cameras (140-2, 140-3, 140-4), as the two cameras for generating the animation having a three-dimensional sense. For example, the electronic device 101 may activate the two cameras 140-1 and 140-4 substantially simultaneously to obtain images including the subject 310 from those cameras 140-1 and 140-4. The images may be obtained by the cameras 140-1 and 140-4 capturing the subject 310 at viewpoints spaced apart from each other, and may have a disparity according to a distance between the cameras 140-1 and 140-4. The electronic device 101 according to various embodiments may generate the animation having a three-dimensional effect according to the disparity, by concatenating the images having a disparity.

As described above with reference to FIGS. 3A to 3B, and 5A to 5B, the electronic device 101 according to various embodiments may select another camera to be controlled together with the camera 140-1 for generating the preview image, from among a plurality of cameras included in the electronic device 101. For example, the electronic device 101 may select another camera capable of obtaining another image having a disparity with respect to an image obtained from the camera 140-1, based on the posture of the electronic device 101 by at least one of a portrait mode, a landscape mode, a folding mode, or an unfolding mode. By controlling the selected other camera and the camera 140-1 according to a single shooting input, the electronic device 101 may obtain a plurality of images having a disparity.

Hereinafter, an operation of processing a plurality of images having a disparity by the electronic device 101 according to various embodiments will be described in more detail with reference to FIGS. 6A, 6B, and 6C.

Figure 6A:
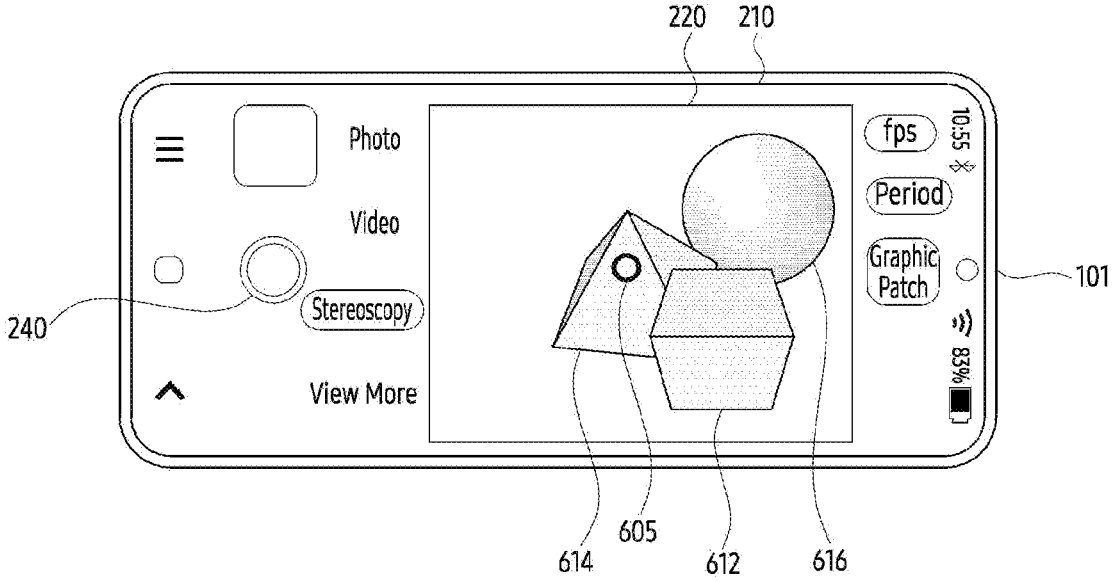
FIGS. 6A, 6B, and 6C are diagrams for describing an example operation performed by an example electronic device using each of a plurality of cameras, according to various embodiments.
Figure 6B:
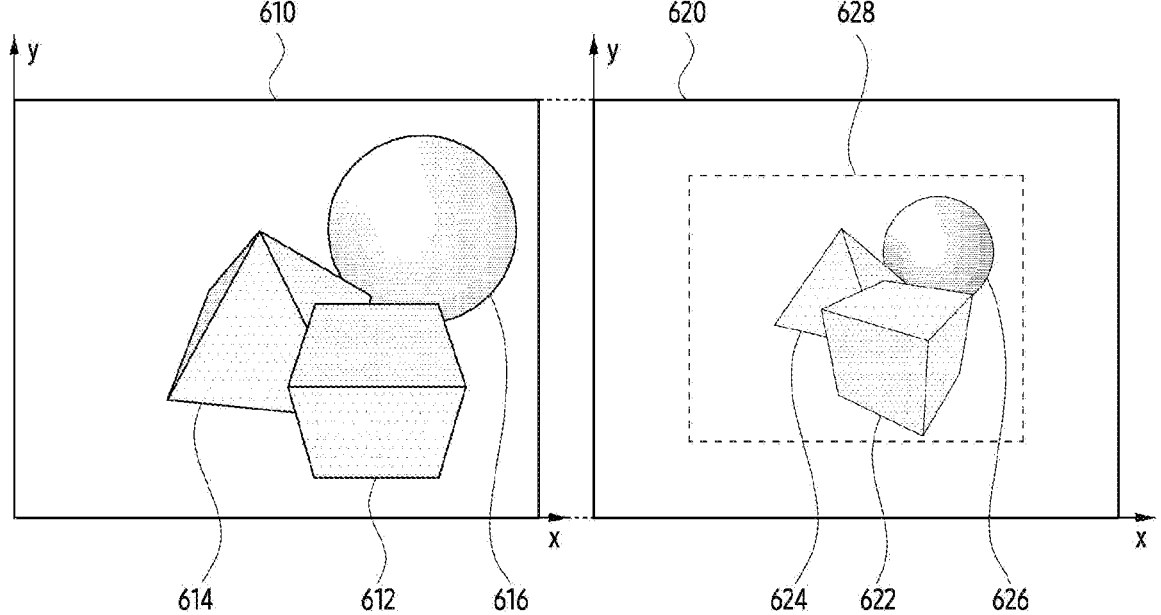
Figure 6C:
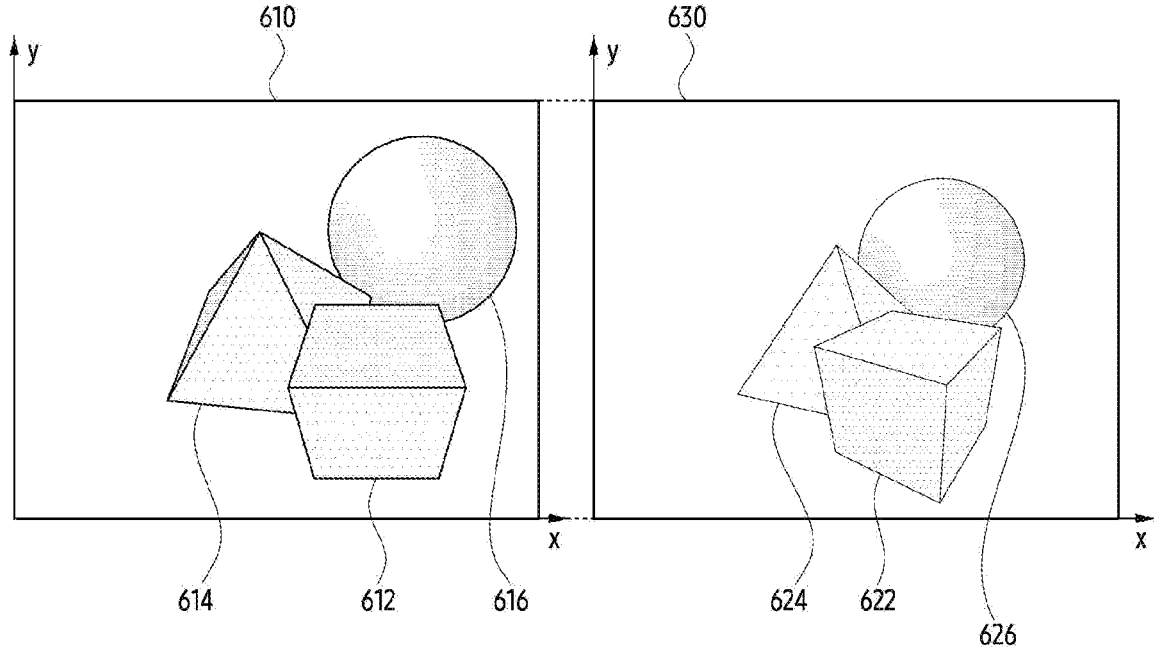

FIGS. 6A, 6B, and 6C are diagrams for describing an operation performed by the electronic device 101 using each of a plurality of cameras, according to various embodiments. The electronic device 101 of FIGS. 6A, 6B, and 6C may correspond to the electronic device 101 of FIGS. 1, 2, 3A and/or 3B. Hereinafter, although the operation of the electronic device 101 in the state 300 of FIG. 3A is described, embodiments are not limited thereto, and the electronic device 101 of FIGS. 4A, 4B, and 4C, and 5A or 5B may be operated similarly to the operation described below.

FIG. 6A shows a screen 210 displayed by the electronic device 101 in the state 300 of FIG. 3A. The electronic device 101 may display a preview image 220 based on a first camera (e.g., the camera 140-1 of FIG. 3A) among a plurality of cameras included in the electronic device 101, on the screen 210. The screen 210 displayed by the electronic device 101 may correspond, for example, to the screen 210 of FIG. 2. Hereinafter, descriptions duplicating those of FIG. 2 are not repeated for convenience.

As one or more subjects (e.g., the subject 310 of FIG. 3A) are included in the FOV (e.g., the FOV indicated by the angle of view 320-1 of FIG. 3A) of the first camera, one or more visual objects corresponding to the one or more subjects may be displayed in the preview image 220. Referring to FIG. 6A, each of the visual objects (612, 614, 616) displayed in the preview image 220 may correspond to each of the subjects (312, 314, 316) of FIG. 3A. In response to receiving a shooting input related to the icon 240, the electronic device 101 may activate the first camera and the second camera (e.g., the camera 140-2 of FIG. 3A) with a FOV having a disparity with respect to the FOV of the first camera, and then obtain, from each of the first camera and the second camera, a first image and a second image having a disparity with respect to the first image. In order for the electronic device 101 to obtain the first image and the second image, an operation of selecting at least one camera from among a plurality of cameras may be performed similarly to those described above with reference to FIG. 3A or 3B.

Since a plurality of cameras have different FOVs, the electronic device 101 according to various embodiments may change at least one of the first image and the second image, before concatenating to generate an animation having a three-dimensional effect. In order to obtain information to be used to change at least one of the first image and the second image, the electronic device 101 according to various embodiments may display a visual guide 605 included in the preview image 220. The visual guide 605 may overlap any one of one or more visual objects, included in the preview image 220 and corresponding to each of one or more subjects included in the FOV of the first camera. The shape of the visual guide 605 is not limited to the shape of a circular line of FIG. 6A, and may have a square and/or cross shape.

Referring to FIG. 6A, the visual guide 605 may overlap the visual object 614 corresponding to the subject corresponding to a pyramid in the preview image 220. The electronic device 101 may display the visual guide 605 in the center of the preview image 220. The position of the visual guide 605 in the preview image 220 may be adjusted by a user input performed within the preview image 220. An operation performed by the electronic device 101 in response to identifying a user input for changing the position of the visual guide 605 will be described below with reference to FIG. 8.

The electronic device 101 according to various embodiments may obtain information to be used to change at least one of the first image and the second images, based on the position of the visual guide 605 in the preview image 220 and/or the visual object 614 overlapping the visual guide 605. The above information may include, for example, data indicating a distance between a subject (e.g., the subject 314 of FIG. 3A) corresponding to the visual object 614 and the electronic device 101. For example, the electronic device 101 may obtain a distance between the subject corresponding to the visual object 614 overlapping the visual guide 605 and the electronic device 101, using the distance sensor 154 of FIGS. 1 and/or 3A. The electronic device 101 may obtain the distance substantially simultaneously with a time point at which the first image and the second image are obtained.

FIG. 6B is a diagram illustrating a first image 610 and a second image 620 obtained by the electronic device 101 according to various embodiments from each of the first camera and the second camera, in response to receiving a shooting input, in the example state of FIG. 6A. The first image 610 may be obtained using the first camera corresponding to the preview image 220 of FIG. 6A. The second image 620 may be obtained by the second camera having a disparity with respect to the first camera. For example, each of the first camera and the second camera may correspond to a camera 140-1 corresponding to a wide-angle camera of FIG. 3A and a camera 140-2 corresponding to an ultra-wide-angle camera. In the above example, the FOV of the second camera may be greater than the FOV of the first camera. For example, the FOV of the first camera may be included in the FOV of the second camera.

In various embodiments, as at least portions of the FOVs of the first camera and the second camera corresponding to each of the first image 610 and the second image 620 overlap each other, each of the first image 610 and the second image 620 may include visual objects corresponding to the same subject. For example, referring to the first image 610 and the second image 620, both of the visual objects 612 and 622 may correspond to one subject (e.g., the subject 312 of FIG. 3A) corresponding to a cuboid. For example, both of the visual objects 614 and 624 may correspond to one subject (e.g., the subject 314 of FIG. 3A) corresponding to a pyramid. For example, both of the visual objects 616 and 626 may correspond to one subject (e.g., the subject 316 of FIG. 3A) corresponding to a sphere.

In various embodiments, as the first camera and the second camera have distinct FOVs, visual objects corresponding to the same subject in the first image 610 and the second image 620 may have different sizes and positions. Referring to FIG. 6B, when the sizes of the first image 610 and the second image 620 match each other, the FOV of the first camera is included in the FOV of the second camera, and thus, the size of the visual object included in the second image 620 may be smaller than the size of the visual object included in the first image 610 and corresponding to the same subject as the visual object. For example, referring to the visual objects 612 and 622 corresponding to one subject (e.g., the subject 312 of FIG. 3A) corresponding to the cuboid, the size of the visual object 612 of the first image 610 may be greater than the size of the visual object 622 of the second image 620.

In various embodiments, as the FOV of the first camera and the FOV of the second camera have a disparity, the visual objects corresponding to the same subject in the first image 610 and the second image 620 may represent different shapes of the subject viewed at different viewpoints. For example, referring to the visual objects 612 and 622 corresponding to one subject (e.g., the subject 312 of FIG. 3A) corresponding to the cuboid, the visual object 612 of the first image 610 may represent only two sides of the sides of the cuboid, and the visual object 622 of the second image 620 may represent three sides of the sides of the cuboid. For example, referring to the visual objects 614 and 624 corresponding to one subject (e.g., the subject 314 of FIG. 3A) corresponding to the pyramid, the visual object 614 of the first image 610 may represent three of the sides of the pyramid, and the visual object 624 of the second image 620 may represent two of the sides of the pyramid. As described above, in each of the first image 610 and the second image 620, the shapes of visual objects corresponding to the same subject are distinguished by the disparity, and thus, the animation generated based on the first image 610 and second image 620 may provide a three-dimensional effect according to the shapes of the distinguished visual objects.

The electronic device 101 according to various embodiments may change at least one of the first image 610 and the second image 620, based at least on a subject corresponding to the visual guide 605. For example, based on a distance between the subject and the electronic device 101, the electronic device 101 may change at least one of the first image 610 and the second image 620. The electronic device 101 according to various embodiments may change at least one of the first image 610 and the second image 620, based on information related to the FOVs of the first camera and the second camera used for obtaining the first image 610 and the second image 620. The electronic device 101 according to various embodiments may change the FOV of the second image 620 obtained by the second camera distinct from the first camera corresponding to the preview image 220, based on the FOV of the first image 610. For example, the electronic device 101 may identify a portion 628 having the FOV related to the FOV of the first image 610 from the second image 620.

In various embodiments, the information used by the electronic device 101 to change at least one of the first image

610 and the second image 620 may be information related to the FOV of the first camera and/or the second camera used for obtaining the first image 610 and the second image 620, including a zoom factor of at least one of the first camera and the second camera. The zoom factor may be, for example, a parameter related to at least one of a lens of the first camera or a lens of the second camera. For example, the electronic device 101 may obtain a size of the portion 628 having a FOV corresponding to the FOV of the first image 610 in the second image 620, based on a zoom factor of at least one of the first camera and the second camera.

In various embodiments, the information used by the electronic device 101 to change at least one of the first image 610 and the second image 620 may include information indicating a difference between positions of the first camera and the second camera used for obtaining the first image 610 and the second image 620. The difference between the positions may cause a difference in the central axis of the FOVs of each of the first camera and the second camera. For example, the information may indicate a distance spaced apart between the first camera and the second camera along a designated direction (e.g., a horizontal direction and/or a vertical direction) on the electronic device 101. For example, the electronic device 101 may identify a position (e.g., a position on y-axis corresponding to the vertical direction) of the portion 628 having a FOV corresponding to the FOV of the first image 610 in the second image 620, based on a distance spaced apart between the first camera and the second camera in the vertical direction (e.g., a width direction of the electronic device in the landscape mode).

In various embodiments, the information used by the electronic device 101 to change at least one of the first image 610 and the second image 620 may include information indicating a distance between the subject corresponding to the visual guide 605 and the electronic device 101. For example, the electronic device 101 may identify a position of the portion 628 having a FOV corresponding to the FOV of the first image 610 in the second image 620, based on a distance that the first camera and the second camera are separated along a horizontal direction (e.g., the length direction of the electronic device in a portrait mode), and a distance between a subject (e.g., the subject 314 of FIG. 3A) and the electronic device 101 obtained using a distance sensor (e.g., the distance sensor 154 of FIG. 3A). For example, as the distance between the subject and the electronic device 101 increases, the position of the portion 628 may converge toward a position corresponding to the central axis of the first image 610 in the second image 620.

Referring to FIG. 6B, the portion 628 identified in the second image 620 by the electronic device 101 according to various embodiments is shown, based on information representing the FOVs of the first and second cameras used to obtain the first image 610 and the second image 620, and the distance between the subject and the electronic device 101 indicated by the visual guide 605. As described above, the size of the portion 628 may be related to a zoom factor of FOVs of the first camera and the second camera. In the second image 620, the position of the portion 628 on the y-axis may be related to information (e.g., a vertical offset) indicating a difference between the first camera and the second camera in the vertical direction corresponding to the y-axis. In the second image 620, the position of the portion 628 on the x-axis may be related to information (e.g., a horizontal offset) indicating a difference between the first camera and the second camera in the horizontal direction corresponding to the x-axis. The electronic device 101 may scale the portion 628 identified in the second image 620 to obtain another image having the size of the first image 610.

FIG. 6C is a diagram illustrating a third image 630 obtained by scaling the portion 628 of FIG. 6B by the electronic device 101 according to various embodiments. As described above, the electronic device 101 may identify the portion 628 of the second image 620 related to the FOV of the first image 610 obtained from the first camera used to provide the preview image 220. The electronic device 101 may obtain a third image 630 having the same size as the size of the first image 610, by adaptively enlarging or reducing the identified portion 628 to a dimension (e.g., width and/or aspect ratio) of the first image 610. For example, the dimension of the third image 630 may match the size of the first image 910.

After receiving the shooting input, the electronic device 101 according to various embodiments may alternately display the first image 610 and the obtained third image 630 on a display of the electronic device 101, in response to obtaining the third image 630. For example, the electronic device 101 may alternately display the first image 610 and the third image 630, based on a specific period indicated by the text 264 of FIG. 2 or adjusted by a user input related to the text 264. For example, the electronic device 101 may alternately display the first image 610 and the third image 630, as a preview of an animation to be generated from the first image 610 and the third image 630. For example, in the preview image 220 of FIG. 2, the electronic device 101 may alternately display the first image 610 and the third image 630.

Referring to FIG. 6C, since the third image 30 corresponds to the portion 628 of the second image 620, it may include at least a portion of the visual objects (622, 624, 626) included in the second image 620. In the third image 630, the visual objects (622, 624, 626) may correspond to the same subject as each of the visual objects (612, 614, 616) of the first image 610. In the third image 630, the size of the visual objects (622, 624, 626) may correspond to the size of each of the visual objects (612, 614, 616) of the first image 610. In the third image 630, the shapes of the visual objects (622, 624, 626) may be distinguished from the shapes of the visual objects (612, 614, 616) of the first image 610 as the third image 630 has a disparity with respect to the first image 610.

Since the electronic device 101 according to various embodiments generates the third image 630 based on the distance between the subject and the electronic device 101 as indicated by the visual guide 605, the position of the visual object 624 corresponding to the subject in the third image 630 may match the position of the visual object 614 corresponding to the subject in the first image 610. As the position of the visual object 624 in the third image 630 and the position of the visual object 614 in the first image 610 match each other, the first image 610 and the third image 630 may correspond to images taken from each of two viewpoints spaced apart by an equal distance from a central axis included in one subject corresponding to the visual objects 614 and 624 (e.g., the subject 314 corresponding to the pyramid of FIG. 3A). As the electronic device 101 alternately displays the first image 610 and the third image 630, the electronic device 101 may provide an effect (e.g., an arc shot) such as if it had photographed one subject along an arc formed around the subject. As the third image 630 has a disparity with respect to the first image 610, the electronic device 101 may alternately display the first image 610 and the third image 630 to provide a three-dimensional effect.

The electronic device 101 according to various embodiments may provide the user with a function for adjusting (e.g., fine tuning) at least one of the first image 610 and the third image 630, while alternately displaying the first image 610 and the third image 630. For example, the electronic device 101 may display a UI for adjusting information (e.g., the zoom factor, the vertical offset, and/or the horizontal offset) used to identify the portion 628, together with a portion of a display on which the first image 610 and the third image 630 are alternately displayed. For example, the electronic device 101 may display a UI for adjusting the position and/or size of the portion 628 in the second image 620 based on a gesture such as drag and/or pinch-to-zoom. Based on the information adjusted by the UI, the electronic device 101 may adjust the size and/or position of the portion 628 in the second image 620. By scaling the portion 628 having an adjusted size and/or an adjusted position, the electronic device 101 may change the display of the third image 630. In response to receiving a user input for generating an animation, the electronic device 101 according to various embodiments may generate another image for providing an animation by concatenating the first image 610 and the third image 630.

As described above, the electronic device 101 according to various embodiments may control both the first camera and the second camera with a single shooting input to obtain the first image (e.g., the first image 610 of FIGS. 6B and/or 6C) and the second image 620 from each of the first camera and the second camera. The first camera may correspond to a first camera providing the preview image 220 of FIG. 6A, and the second camera may correspond to a second camera having a disparity with respect to the first camera. As the electronic device 101 plays back an animation that alternately reproduces the first image 610 and the third image 630 obtained from the second image 620, the electronic device 101 may provide a three-dimensional effect caused by the disparity to a user who watches the animation. Such a three-dimensional effect provided by the reproduction of the animation may be provided independently of a lenticular display and/or a three-dimensional display that provides a distinct image to each of the user's two eyes. Since the electronic device 101 generates an animation that provides a three-dimensional effect with only a single shooting input, the user may more easily obtain the animation for a moving subject.

Hereinafter, referring to FIG. 7, a detailed description will be made of an operation of adding a visual object independent of a subject disposed in the FOV by the electronic device 101 according to various embodiments while displaying previews of the animation based on the first image 610 and the third image 630.

Figure 7:
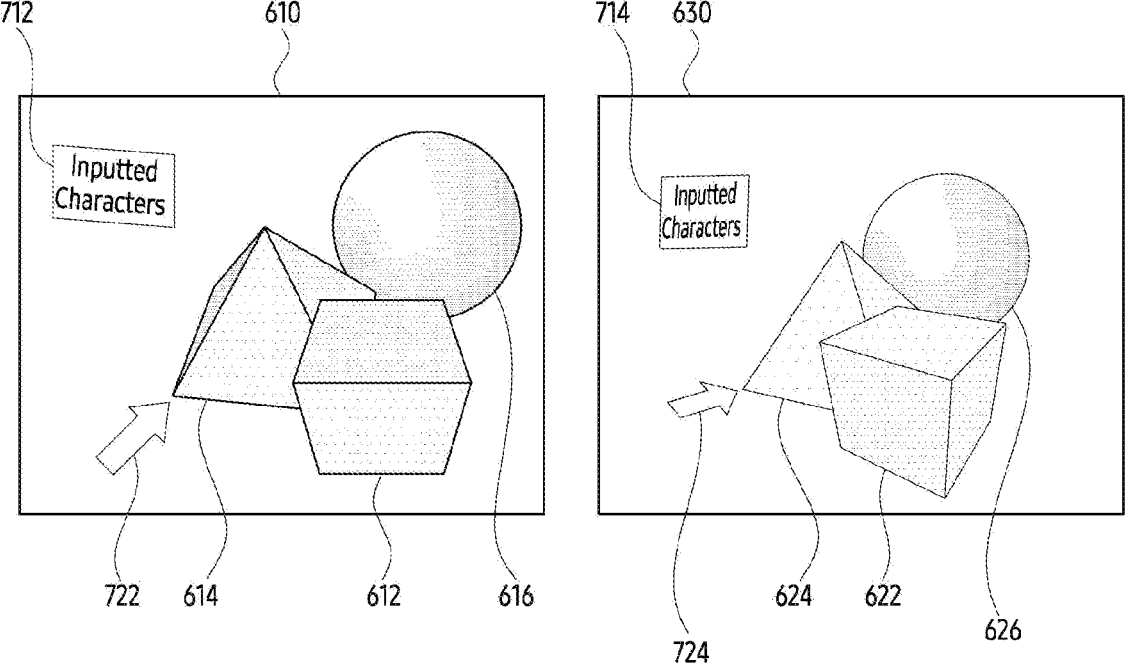
FIG. 7 is a diagram for describing an example operation of combining one or more visual objects with each of a plurality of images obtained by an example electronic device from each of a plurality of cameras, according to various embodiments.

FIG. 7 is a diagram for describing an operation of combining one or more visual objects (712, 714, 722, 724) with each of a plurality of images 610 and 630 obtained by an electronic device from each of a plurality of cameras, according to various embodiments. The electronic device of FIG. 7 may correspond to the electronic device 101 of FIGS. 1 to 2 or 3A and 3B, and/or the electronic device of FIGS. 6A, 6B, and 6C. Hereinafter, in a state that the electronic device has obtained the first image 610 and the third image 630 of FIG. 6C by photographing the subject 310 in the state 300 of FIG. 3A, description will be made of an operation in which the electronic device combines a visual object independent of the subject 310 with the first image 610 and the third image 630. For example, in response to receiving a user input related to the text 266 of FIG. 2, the electronic device may add a visual object independent of the subject 310 to the first image 610 and the third image 630.

The visual object that the electronic device according to various embodiments adds to the first image 610 and the third image 630 may be a graphic object independent of the subject photographed by the first image 610 and the third image 630, including text input by the user and/or images and/or icons selected by the user. Referring to FIG. 7, the electronic device may add text input from a user through a speaker-to-text (STT) and/or a soft keyboard displayed on at least a portion of a display of the electronic device, to each of the first image 610 and the third image 630, using the visual objects 712 and 714. Referring to FIG. 7, the electronic device may add an image (e.g., an arrow-shaped image) selected by the user to each of the first image 610 and the third image 630, using the visual objects 722 and 724.

The electronic device according to various embodiments may change the shape of the visual objects that are added to each of the first image 610 and the third image 630 and corresponding to the graphic object, based on the disparity. The disparity may be adjusted by a user. Referring to FIG. 7, the visual objects 712 and 714 may have a shape distinguished in each of the first image 610 and the third image 630, according to a disparity adjusted by the user. Similarly, the visual objects 722 and 724 may have different shapes and positions in each of the first image 610 and the third image 630, depending upon the disparity adjusted by the user. For example, the electronic device may obtain a visual object 724 to be combined to the third image 630, by scaling and/or tilting the visual object 722 combined to the first image 610. The electronic device may combine the obtained visual object 724 to the third image 630.

The electronic device according to various embodiments may perform combining the visual objects (712, 714, 722, 724) corresponding to the graphic object to the first image 610 and the third image 630, based on a layer overlaid on each of the first image 610 and the third image 630. For example, in a state of displaying a preview of an animation to be generated from the first image 610 and the third image 630, the electronic device may render at least one of the visual objects (712, 714, 722, 724) on the layer. Using the layer overlaid on each of the first image 610 and the third image 630, the electronic device may respond to one or more user inputs for adding, deleting, and/or changing the visual object corresponding to the graphic object. In response to receiving a user input for storing the animation, the electronic device may add one or more visual objects included in the overlaid layer (e.g., the visual objects (712, 714, 722, 724) included in the layer overlaid on each of the first image 610 and the third image 630), to each of the first image 610 and the third image 630. The electronic device may obtain another image for providing an animation, by concatenating the first image 610 and the third image 630 to which each of the visual objects (712, 714, 722, 724) is added.

As described above, the electronic device according to various embodiments may combine one or more visual objects based on a graphic object, into an animation for providing a three-dimensional effect. One or more visual objects based on the graphic object may have a shape and/or position distinguished by a disparity in each of a plurality of images included in the animation. Hereinafter, referring to FIG. 8, an operation will be described in which an electronic device according to various embodiments selects one subject to measure a distance spaced from the electronic device from among a plurality of subjects.

Figure 8:
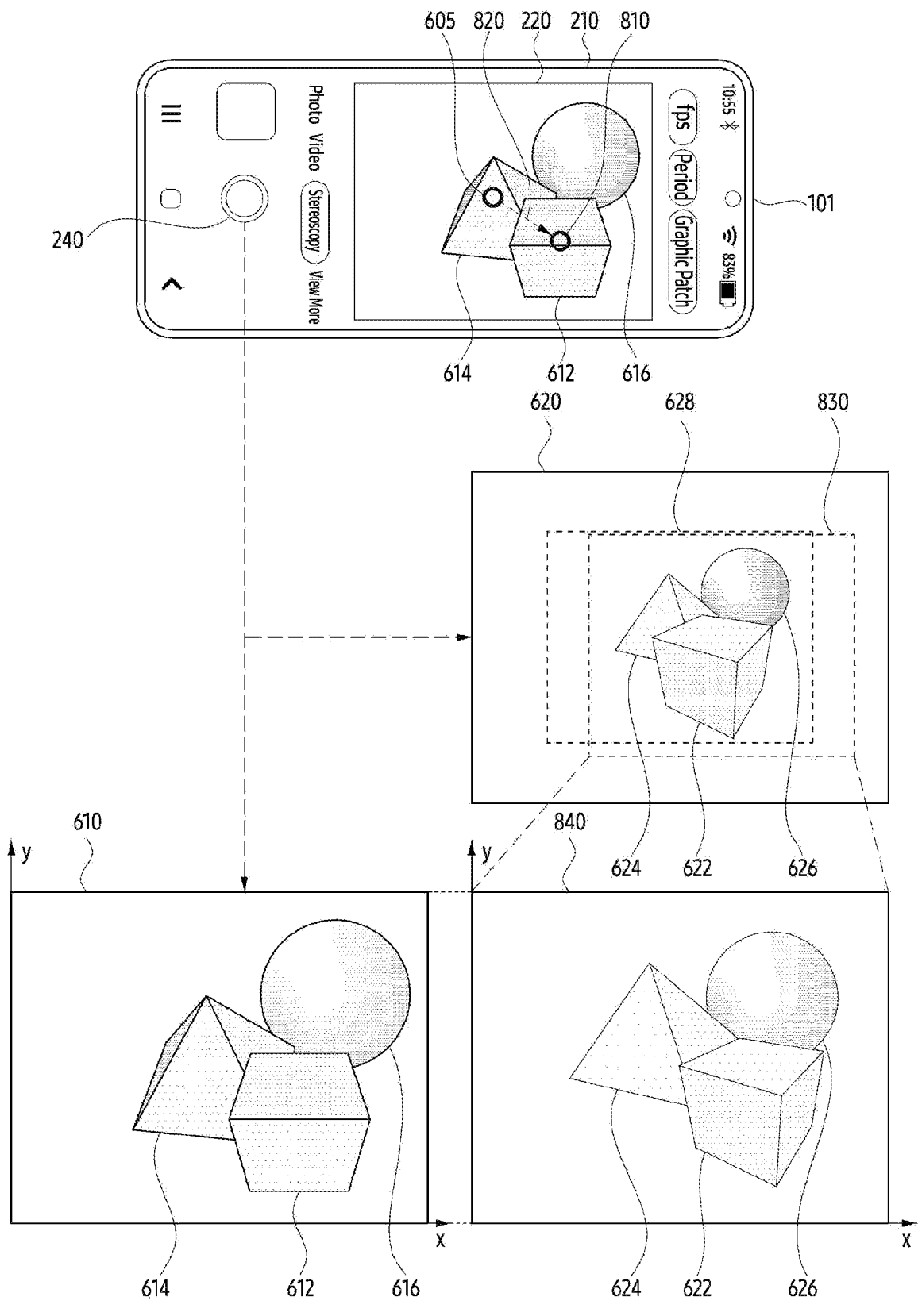
FIG. 8 is a diagram for describing an example operation performed by an example electronic device based on a user input of selecting any one of a plurality of subjects, according to various embodiments.

FIG. 8 is a diagram for describing an operation performed by the electronic device 101 according to various embodiments based on a user input for selecting any one of a plurality of subjects. The electronic device 101 of FIG. 8 may correspond to the electronic device 101 of FIGS. 1 to 2 or 3A and 3B, and/or the electronic device 101 of FIGS. 6A, 6B, and 6C and/or 7. Hereinafter, while the operation of the electronic device 101 is described with reference to the state 300 of FIG. 3A and/or the state of FIG. 6A, the embodiments are not limited thereto, and the electronic devices 101 of FIGS. 4A, 4B, and 4C and 5A and 5B may be also operated similarly to the operation described below.

The electronic device 101 according to various embodiments may display a visual guide 605 having a position that is adjustable by a user input in the preview image 20. Referring to FIG. 8, the visual guide 605 may be displayed overlapping at least a portion of the visual object 614 corresponding to one subject (e.g., the subject 314 corresponding to the pyramid of FIG. 3A) in the preview image 220. In response to receiving the shooting input based on the icon 240, the electronic device 101 may obtain the first image 610 and the second image 620. In a state that the visual guide 605 overlaps at least a portion of the visual object 614, the electronic device 101 may extract a portion 628 from the second image 620, based on a distance between one subject indicated by the visual object 614 and the electronic device 101, similarly to those described in FIGS. 6A, 6B, and 6C. Based on the extracted portion 628, the electronic device 101 may obtain the third image 630 of FIG. 6C. Hereinafter, descriptions that are redundant with FIGS. 3A and 6A to 6C will not be repeated for brevity of description.

In various embodiments, when the visual objects (612, 614, 616) corresponding to each of a plurality of subjects are displayed in the preview image 220, the user may use the visual guide 605 to select a subject having a fixed position in the images included in an animation to be generated in the electronic device 101. The position of the visual guide 605 may be changed in response to the electronic device 101 receiving a click, a touch, and/or a drag gesture performed in the preview image 220. For example, in response to receiving a drag gesture that begins on the visual guide 605 and ends at a position 810, such as a trajectory 820, the electronic device 101 may change the position of the visual guide 605 to the position 810.

In response to receiving a shooting input based on the icon 240 in a state of the position of the visual guide 605 being changed to the position 810, the electronic device 101 may identify a distance between one subject corresponding to the visual object 612 disposed at the position 810 (e.g., the subject 312 corresponding to the rectangular parallelepiped of FIG. 3A) and the electronic device 101. In an example that the distance sensor (e.g., the distance sensor 154 of FIGS. 1 and/or 3A) corresponds to a laser sensor, the electronic device 101 may use the laser sensor to emit laser light toward the one subject corresponding to the visual object 612, and obtain the distance between the one subject and the electronic device 101, based on the laser light reflected from the one subject. In an example that the distance sensor corresponds to a ToF sensor, the electronic device 101 may obtain a depth image having a FOV overlapping at least a portion of the FOV of the first camera related to the preview image 220. In response to identifying a depth value corresponding to the position 810 in the depth image, the electronic device 101 may identify a distance between one subject corresponding to the visual object 612 and the electronic device 101.

The electronic device 101 according to various embodiments may obtain a third image 840 to be alternately displayed with the first image 610 from the second image 620, based on the distance between the electronic device 101 and the subject indicated by the visual guide moved to the position 810, and a difference between the FOVs of the first image 610 and the second image 620. Referring to FIG. 8, a portion 830 selected by the electronic device 101 in the second image 620 based on a distance between the electronic device 101 and the subject indicated by the visual guide moved to the position 810 is shown. The size of the portion 830 may be related to a ratio of sizes of each of the FOVs of the first image 610 and the second image 620. The position of the portion 830 on the y-axis may be related to a difference in a direction (e.g., the vertical direction) corresponding to the y-axis of the FOVs of the first image 610 and the second image 620. The position of the portion 830 on the x-axis may be related to a difference in a direction (e.g., the horizontal direction) corresponding to the x-axis of the FOVs, and a distance between the electronic device 101 and the subject indicated by the visual object moved to the position 810.

Referring to FIG. 8, the portion 628 of FIG. 6B is shown together with a portion 830 determined by the visual guide moved to the position 810. Referring to the portions 628 and 830, the electronic device 101 may select the portions 628 and 830 distinguished from each other in the second image 620 according to a change in the position of the visual guide 605. Referring to FIG. 8, a third image 840 obtained by scaling the portion 830 by an electronic device according to various embodiments is shown. The third image 840 may be alternately displayed with the first image 610 to form an animation that provides a three-dimensional effect. Referring to the first image 610 and the third image 840, the position of the visual object 622 corresponding to one subject indicated by the position 810 in the third image 840 may substantially match the position of the visual object 612 corresponding to the one subject in the first image 610. As the electronic device 101 alternately displays the first image 610 and the third image 840 while the positions of the visual objects 612 and 622 substantially match each other identical in the first image 610 and the third image 840, the electronic device 101 may provide the same effect as if it had photographed the one subject along an arc formed around the one subject corresponding to the visual objects 612 and 622.

As described above, while the visual objects (612, 614, 616) corresponding to a plurality of subjects are displayed in the preview image 220, the electronic device 101 according to various embodiments may identify a distance between the electronic device 101 and the one subject selected by a user input related to the visual guide 605. The identified distance may be used to obtain images (e.g., the first image 610 and the third image 840) on distinct viewpoints included in the arc formed around the one subject. The electronic device 101 may obtain another image having a three-dimensional effect by concatenating the obtained images.

Hereinafter, referring to FIGS. 9A and 9B, an operation will be described of obtaining one or more other images to be disposed between the plurality of images in a time domain, in a state of the electronic device 101 according to various embodiments generating an animation based on a plurality of images (e.g., the first image 610 and the third image 840) obtained based on a plurality of cameras.

Figure 9A:
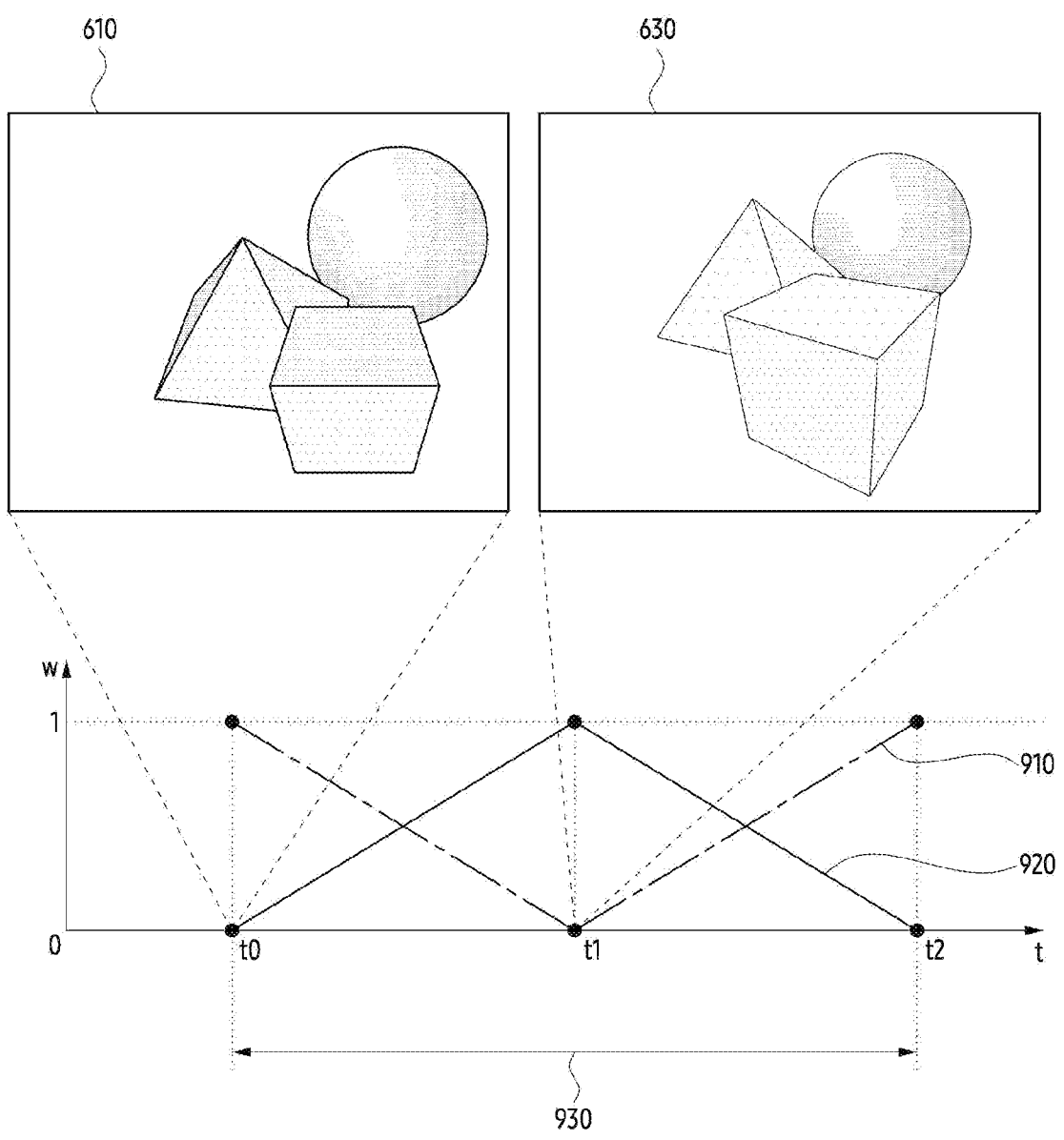
FIGS. 9A and 9B are diagrams for describing an example operation of interpolating a plurality of images obtained by an example electronic device from each of a plurality of cameras, according to various embodiments.
Figure 9B:
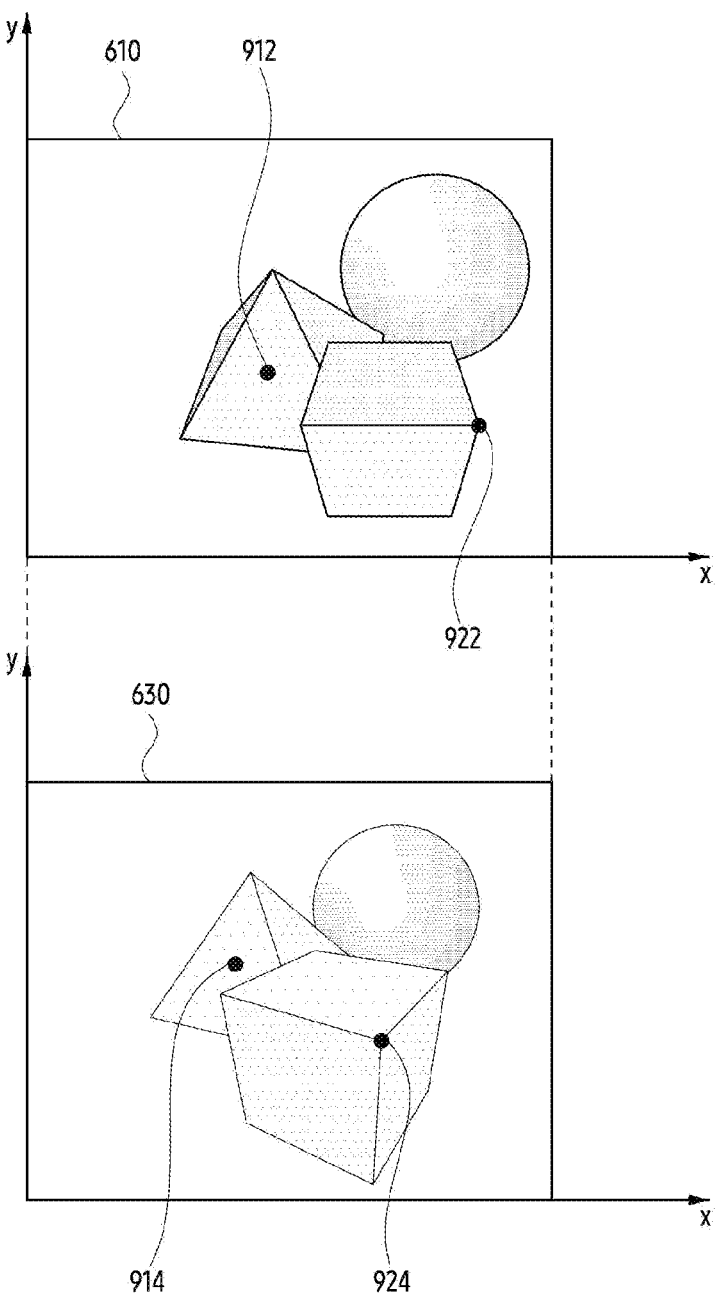

FIGS. 9A and 9B are diagrams for describing an operation of interpolating a plurality of images obtained by an electronic device from each of a plurality of cameras, according to various embodiments. The electronic devices of FIGS. 9A and 9B may correspond to the electronic device of FIGS. 1 to 2, 3A and 3B, or the electronic device of FIGS. 6A, 6B, and 6C. Hereinafter, in a state of obtaining the first image 610 and the third image 630 of FIG. 6C, an operation will be described in which an electronic device according to various embodiments obtains one or more other images to be displayed between the first image 610 and the third image 630 in a time domain, within an animation based on the first image 610 and the third image 630. While the operation of the electronic device in the state of obtaining the first image 610 and the third image 630 of FIG. 6C is described, embodiments are not limited thereto, and the electronic device 101 of FIG. 8 may also generate an animation according to the operation to be described below.

Referring to FIG. 9A, there are shown graphs 910 and 920 indicating weights to be applied to each of the first image 610 and the third image 630, in order for the electronic device according to various embodiments to generate an animation provided over a period 930 from the first image 610 and the third image 30. The period 930 may be adjusted, for example, by a user input related to the text 264 of FIG. 2. Referring to FIG. 9A, the animation obtained by the electronic device 101 by concatenating the first image 610 and the third image 630 may be an animation in which a plurality of images including the first image 610 and the third image 630 are alternately reproduced over the period 930. The electronic device 101 according to various embodiments may interpolate the first image 610 and the third image 630 with the weights indicated by the graphs 910 and 920 to obtain one or more images disposed between the first image 610 and the third image 630 on a time axis, so as to be displayed between the first image 610 and the third image 630. The number of the one or more images obtained by the electronic device 101 by interpolating the first image 610 and the third image 630 may be related, for example, to a frame rate adjusted by a user input related to the text 262 of FIG. 2.

Referring to FIG. 9A, the graph 910 represents a first weight to be applied to the first image 610. The graph 920 represents a second weight to be applied to the third image 630. The electronic device 101 according to various embodiments may obtain a plurality of images corresponding to each of a plurality of viewpoints in the period 930, by combining the first image 610 to which the first weight represented by the graph 910 is applied and the third image 630 to which the second weight represented by the graph 920 is applied. Combining the first image 610 to which the first weight is applied and the third image 630 to which the second weight is applied may be performed based on cross fading. For example, the first weight and the second weight may be applied to a plurality of pixels included in each of the first image 610 and the third image 630. The electronic device 101 may store the obtained plurality of images in the electronic device 101 as images representing the animation alternately reproduced over the period 930. The plurality of viewpoints may be, on a time axis, for example, spaced apart along a time interval based on a frame rate adjusted by a user input related to the text 262 of FIG. 2. For example, when the duration of the period 930 corresponds to 2 seconds and the frame rate corresponds to 50 fps, the electronic device 101 may obtain 100 images, obtained by combining the first image 610 and the third image 630, using sampled values of the first weight and the second weight corresponding to each of the graphs 910 and 920 at intervals of 0.02 seconds on the time axis, as an image representing an animation that is alternately played back along the period 930.

For example, since the first weight represented by the graph 910 is '1' and the second weight represented by the graph 920 corresponds to '0' at the time point to in the period 930, the image to be reproduced at the time point to may correspond to the first image 610. In the time period between the time point t0 and the time point t1, as the first weight is gradually reduced and the second weight is gradually increased, the electronic device 101 may obtain one or more images representing an animation that is switched from the first image 610 to the third image 630 within the time period. At the time point t1, as the first weight represented by the graph 910 is '0' and the second weight represented by the graph 920 corresponds to '1', the image to be reproduced at the time point t1 may correspond to the third image 630. In the time period between the time point t1 and the time point t2, as the second weight is gradually reduced and the first weight is gradually increased, the electronic device 101 may obtain one or more images representing an animation that is switched from the third image 630 to the first image 610 within the time period. At the time point t2, the first weight represented by the graph 910 is '1' and the second weight represented by the graph 920 corresponds to '0', and thus, the image to be reproduced at the time point t2 may correspond to the first image 610, similar to the time point t0. In the above example, the electronic device 101 may obtain a plurality of images circulated between the first image 610 and the third image 630.

Referring to FIG. 9B, an example operation is shown in which the electronic device according to various embodiments performs interpolation (e.g., motion interpolation) based on movement of a plurality of pixels (912, 914, 922, 924) included in each of the first image 610 and the third image 630, thereby obtaining one or more images to be displayed between the first image 630 and the third image 630 on the time axis, the images being included in the animation. Referring to FIG. 9B, the electronic device may compare pixels of the first image 610 and pixels of the third image 630 to obtain a correspondence relationship between the pixels of the first image 610 and the pixels of the third image 630. For example, the electronic device may identify that the pixel 912 of the first image 610 and the pixel 914 of the third image 630 correspond to each other. For example, the electronic device may identify that the pixel 922 of the first image 610 and the pixel 924 of the third image 630 correspond to each other.

The electronic device according to various embodiments may obtain one or more images to be displayed between the first image 610 and the third image 630, based on a positional relationship of the pixels of each of the first image 610 and the third image 630 indicated by the corresponding relationship. For example, the electronic device may gradually move the pixel 922 in the first image 610 from the first position of the pixel 922 in the first image 610 to the second position of the pixel 924 in the third image 630 to obtain the one or more images. Similarly, the electronic device may move the pixel 912 of the first image 610 toward the second position of the pixel 914 in the third image 630 along the frame rate and the period to obtain the one or more images.

Although not shown herein, even when graphic objects (e.g., the graphic objects corresponding to the visual objects (712, 714, 722, 724) of FIG. 7) are combined to each of the first image 610 and the third image 630, as described above in FIG. 7, the electronic device may interpolate the first image 610 and the third image 630, based on the operations described above in FIGS. 9A and 9B. As the electronic device obtains an animation by concatenating the first image 610, the third image 630, and one or more images obtained by interpolating the first image 610 and the third image 630, the animation may more smoothly express a change in the position and/or size of the subject represented by the first image 610 and the third image 630.

Hereinafter, an operation of the electronic device according to various embodiments will be described in detail with reference to FIGS. 10, 11, 12, and 13.

Figure 10:
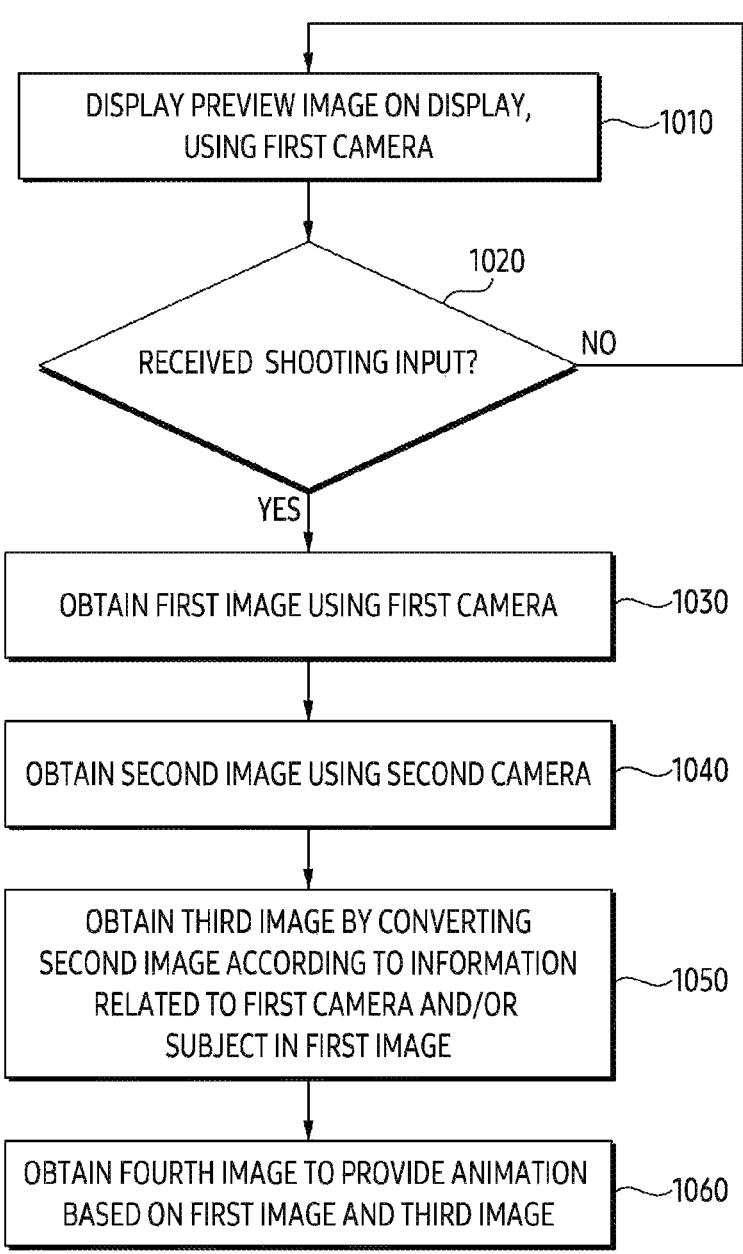
FIG. 10 is a flowchart illustrating an example operation of an example electronic device according to various embodiments.

FIG. 10 is a flowchart illustrating an operation of an electronic device according to various embodiments. The electronic device of FIG. 10 may correspond to the electronic device 101 of FIGS. 1 to 2. For example, at least one of the operations of FIG. may be performed by the electronic device 101 of FIG. 1 and/or the processor 110 of the electronic device 101.

Referring to FIG. 10, in operation 1010, the electronic device according to various embodiments may display a preview image on a display using a first camera. The electronic device may initiate displaying the preview image of the operation 1010, in response to identifying a user input for executing a specified application. For example, the electronic device may include a plurality of cameras including the first camera (e.g., n cameras 140-1, 140-2, . . . 140-n). FOVs of the plurality of cameras may be at least partially overlapping each other or may be distinguished from each other. The first camera may correspond to the camera 140-1 of FIGS. 3A to 3B, and/or 5A to 5B. The preview image may correspond to the preview image 220 of FIGS. 2, 6A, and/or 8. The electronic device according to various embodiments may display the preview image on the display, based on at least a portion of a plurality of images obtained through the first camera. Each of the plurality of images may include one or more first visual objects (e.g., the visual objects (612, 614, 616) of FIG. 6A) corresponding to one or more subjects (e.g., the subject 310 of FIG. 3A) included in the FOV of the first camera.

While displaying the preview image in the operation 1010, in operation 1020, the electronic device according to various embodiments may determine whether it has received a shooting (capture) input. The shooting input may include, for example, a user input for clicking and/or touching the icon 240 of FIG. 2. Prior to receiving the shooting input ('No' in operation 1020), the electronic device may maintain displaying the preview image based on the operation 1010. In various embodiments, the shooting input may include a user input of depressing a button exposed to the outside through at least a portion of a housing of the electronic device 101.

In response to receiving the shooting input ('Yes' in operation 1020), in operation 1030, the electronic device according to various embodiments may obtain the first image using the first camera. The first image may have a FOV corresponding to the preview image of the operation 1010. The first image may correspond, for example, to the first image 610 of FIGS. 6A, 6B, and 6C. The first image may include one or more first visual objects corresponding to one or more subjects included in the FOV of the first camera.

Referring to FIG. 10, in operation 1040, the electronic device according to various embodiments may obtain a second image using a second camera distinct from the first camera. The second camera may correspond to a camera having a disparity with respect to the first camera among a plurality of cameras included in the electronic device. For example, the second camera may correspond to the camera 140-2 of FIGS. 3A, 3B and/or 5A, and/or the camera 140-4 of FIG. 5B. In response to receiving the shooting input, the electronic device according to various embodiments may identify, among the plurality of cameras, the second camera including the one or more subjects and having a FOV with a disparity with respect to the FOV of the first camera. In response to identifying the second camera with a FOV having a disparity with respect to the FOV of the first camera, the electronic device may obtain the second image including one or more second visual objects corresponding to the one or more subjects through the second camera. As the FOV of the second camera has a disparity with respect to the FOV of the first camera, the second visual objects included in the second image and the first visual objects included in the first image may have the form of photographing a subject at different viewpoints.

Referring to the operations 1030 and 1040 of FIG. 10, in response to receiving the shooting input in the operation 1020, the electronic device may control both the first camera and the second camera to obtain both the first image and the second image. For example, the electronic device may perform the operations 1030 and 1040 substantially simultaneously. The sequence of the electronic device performing the operations 1030 and 1040 may not be limited to an embodiment shown in FIG. 10.

Referring to FIG. 10, in operation 1050, the electronic device according to various embodiments may obtain a third image by converting the second image according to information related to the first camera and/or the subject in the first image. For example, similarly to those described above with reference to FIGS. 6A, 6B, and 6C and/or 8, the electronic device may convert the second image to obtain a third image (e.g., the third image 630 of FIG. 6C and/or the third image 830 of FIG. 8). For example, the information may include at least one of a zoom factor, a vertical offset, or a horizontal offset of FIGS. 6A, 6B, and 6C. The electronic device according to various embodiments may obtain the third image including one or more second visual objects that are converted from the second image in the operation 1040, having a size corresponding to the size of one or more first visual objects included in the first image in the operation 1030.

The electronic device according to various embodiments may identify a distance between the electronic device and the subject, using a sensor (e.g., the distance sensor 154 of FIG. 1) included in the electronic device, as information related to the subject in the first image. The electronic device may obtain the third image by converting the second image based on the identified distance. For example, the electronic device may convert the second image, based on at least one of the identified distance, a zoom factor of the first camera related to the first image in the operation 1030, or data representing a positional relationship between the FOV of the first camera and the FOV of the second camera.

Referring to FIG. 10, in operation 1060, the electronic device according to various embodiments may obtain a fourth image for providing an animation based on the first image of operation 1030 and the third image of operation 1050. For example, the electronic device may obtain the fourth image for providing an animation for one or more subjects, by displaying the third image of operation 1050 after displaying the first image of operation 1030. For example, the electronic device may obtain the fourth image for providing an animation for one or more subjects, by concatenating the first image of operation 1030 and the third image of operation 1050 with each other. The electronic device according to various embodiments may obtain the fourth image for providing an animation having a disparity with respect to one or more subjects, by concatenating the third image obtained by converting the second image having a disparity with respect to the first image, with the first image. The fourth image may include a sequence of a first image of operation 1030, a third image of operation 1050, and one or more fifth images obtained by interpolating the first image and the third image. For example, the electronic device displaying the fourth image may display the first image, the third image, and the one or more fifth images, sequentially based on the sequence. The electronic device obtaining the one or more fifth images may be performed similarly to those described above with reference to FIGS. 9A and 9B. The fourth image may correspond to, for example, a wiggle stereoscopy that represents an animation moving repeatedly along the horizontal direction centered on one of one or more subjects.

Hereinafter, an operation in which the electronic device identifies the second camera of operation 1040 according to various embodiments will be described in detail with reference to FIG. 11.

Figure 11:
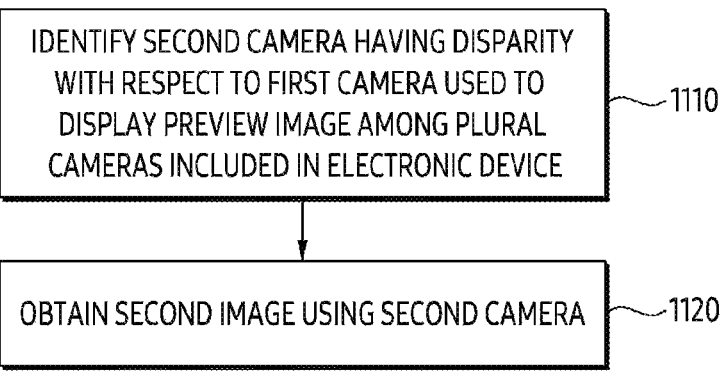
FIG. 11 is a flowchart illustrating an example operation in which an example electronic device selects at least one camera from among a plurality of cameras, according to various embodiments.

FIG. 11 is a flowchart illustrating an operation of selecting at least one camera from among a plurality of cameras by an electronic device according to various embodiments. The electronic device of FIG. 11 may correspond to the electronic device 101 of FIGS. 1 to 2. At least one of the operations of FIG. 11 may be performed by the electronic device 101 of FIG. 1 and/or the processor 110 of the electronic device 101. The operations of FIG. 11 may be related to at least one of the operations of FIG. 10 (e.g., operation 1040). The operations of FIG. 11 may be related to the operations of the electronic device 101 described above in FIGS. 3A to 3B and/or 5A to 5B.

Referring to FIG. 11, in operation 1110, the electronic device according to various embodiments may identify a second camera having a disparity with respect to a first camera used to display a preview image from among a plurality of cameras included in the electronic device. For example, in response to receiving a shooting input in operation 1020 of FIG. 10, the electronic device may identify, from among one or more cameras distinguished from the first camera providing a preview image of the plurality of cameras, a second camera disposed at a position capable of obtaining an image having a disparity with respect to the preview image and/or a first image obtained by the first camera. The disparity may, for example, be related to a person's binocular disparity. The time point at which the electronic device performs the operation 1110 according to various embodiments may, for example, be independent of receiving a shooting input. For example, the electronic device may perform the operation 1110 in response to identifying tilting of the electronic device by the user.

The electronic device according to various embodiments may select a plurality of cameras to be controlled by the shooting input in the operation 1020 of FIG. 10 from among the plurality of cameras, based at least on a posture of the electronic device. A plurality of cameras selected by the electronic device may include the first camera that provides the preview image. For example, the electronic device may select a plurality of cameras to be controlled by a single shooting input, based on a posture of the electronic device that is represented based on at least one of a landscape mode, a portrait mode, an unfolding mode, or a folding mode.

Referring to FIG. 11, in operation 1120, the electronic device according to various embodiments may obtain a second image using a second camera identified by the operation 1110. The electronic device according to various embodiments may perform the operation 1120, similarly to the operation 1040 of FIG. 10. For example, in response to receiving the shooting input in the operation 1020 of FIG. 10, the electronic device may obtain the second image through the second camera identified by the operation 1110, substantially simultaneously with obtaining the first image through the first camera providing the preview image.

As described above, in response to receiving a single shooting input, the electronic device according to various embodiments may simultaneously control at least two cameras having a disparity to obtain at least two images having a three-dimensional effect owing to such a disparity. The electronic device may obtain an image for providing an animation having a three-dimensional effect, based on at least two obtained images. Hereinafter, an operation performed by the electronic device using a sensor for measuring a distance between the subject and the electronic device will be described in detail with reference to FIG. 12.

FIG. 12 is a flowchart illustrating an operation performed by an electronic device based on a distance between a subject and an electronic device according to various embodiments. The electronic device of FIG. 12 may correspond to the electronic device 101 of FIG. 1 or 2. For example, at least one of the operations of FIG. 12 may be performed by the electronic device 101 of FIG. 1 and/or the processor 110 of the electronic device 101. The operations of FIG. 12 may be related to at least one of the operations of FIG. 10 or 11. The operations of FIG. 12 may be related to the operations of the electronic device 101 described above with reference to FIG. 8.

Referring to FIG. 12, in operation 1210, the electronic device according to various embodiment may display a preview image on a display and a visual guide superimposed on the preview image, using a first camera. The visual guide may include, for example, the visual guide 605 of FIGS. 6A and/or 8. For example, while displaying the preview image, the electronic device may display a visual guide superimposed on the visual object in the preview image corresponding to a subject included in the FOV of the first camera. The visual guide may be movable within the preview image by the user, before performing the shooting input, as described above with reference to FIG. 8. The visual guide may be displayed on the preview image before receiving the shooting input, in order to receive a user input related to the conversion of the second image to be obtained from the second camera distinct from the first camera. For example, in a state in which a plurality of visual objects corresponding to each of a plurality of subjects are displayed in the preview image, the visual guide may be displayed to be superimposed on the first visual object, in response to receiving a user input for focusing the first visual object among a plurality of subjects.

Referring to FIG. 12, in operation 1220, the electronic device according to various embodiments may determine whether a shooting input has been received. For example, the electronic device may perform the operation 1220, similarly to the operation 1020 of FIG. 10. In response to receiving the shooting input ('Yes' in operation 1220), in operation 1230, the electronic device according to various embodiments may use the first camera to obtain the first image. For example, the electronic device may perform the operation 1230, similarly to operation 1030 of FIG. 10.

Referring to FIG. 12, in operation 1240, the electronic device according to various embodiments may use a sensor to obtain a distance between the electronic device and the subject corresponding to the visual object superimposed on the visual guide in the preview image. For example, in response to receiving the shooting input in the operation 1230, the electronic device may identify a distance between the electronic device and one subject indicated by the visual guide, using the sensor (e.g., the distance sensor 154 of FIGS. 1, 3A, and/or 5A or 5B).

Referring to FIG. 12, in operation 1250, the electronic device according to various embodiments may use a second camera to obtain a second image. For example, the electronic device may perform the operation 1250 similarly to the operation 1040 of FIG. 10. The electronic device according to various embodiments performing the operations 1230, 1240 and 1250 is not limited to the order illustrated in FIG. 12, and for example, the electronic device may perform the operations 1230, 1240 and 1250 substantially simultaneously.

Referring to FIG. 12, in operation 1260, the electronic device according to various embodiments may obtain a third image by converting the second image of the operation 1250 according to the distance between the subject and the electronic device obtained in the operation 1240. For example, based on the distance between the subject and the electronic device, the electronic device may identify a portion in the second image (e.g., the portion 628 of FIG. 6C and/or the portion 830 of FIG. 8). The electronic device may obtain the third image by scaling the identified portion to a size corresponding to the size of the first image in the operation 1230.

Referring to FIG. 12, in operation 1270, the electronic device according to various embodiments may obtain a fourth image for providing an animation based on the first image and the third image. For example, the electronic device may perform the operation 1270 similarly to the operation 1060 of FIG. 10. As the electronic device according to various embodiments obtains the fourth image based on the distance between the electronic device and the subject obtained based on the operation 1240, the fourth image may represent an animation of photographing the subject along an arc formed around the subject indicated by the visual guide of the operation 1210.

Figure 13:
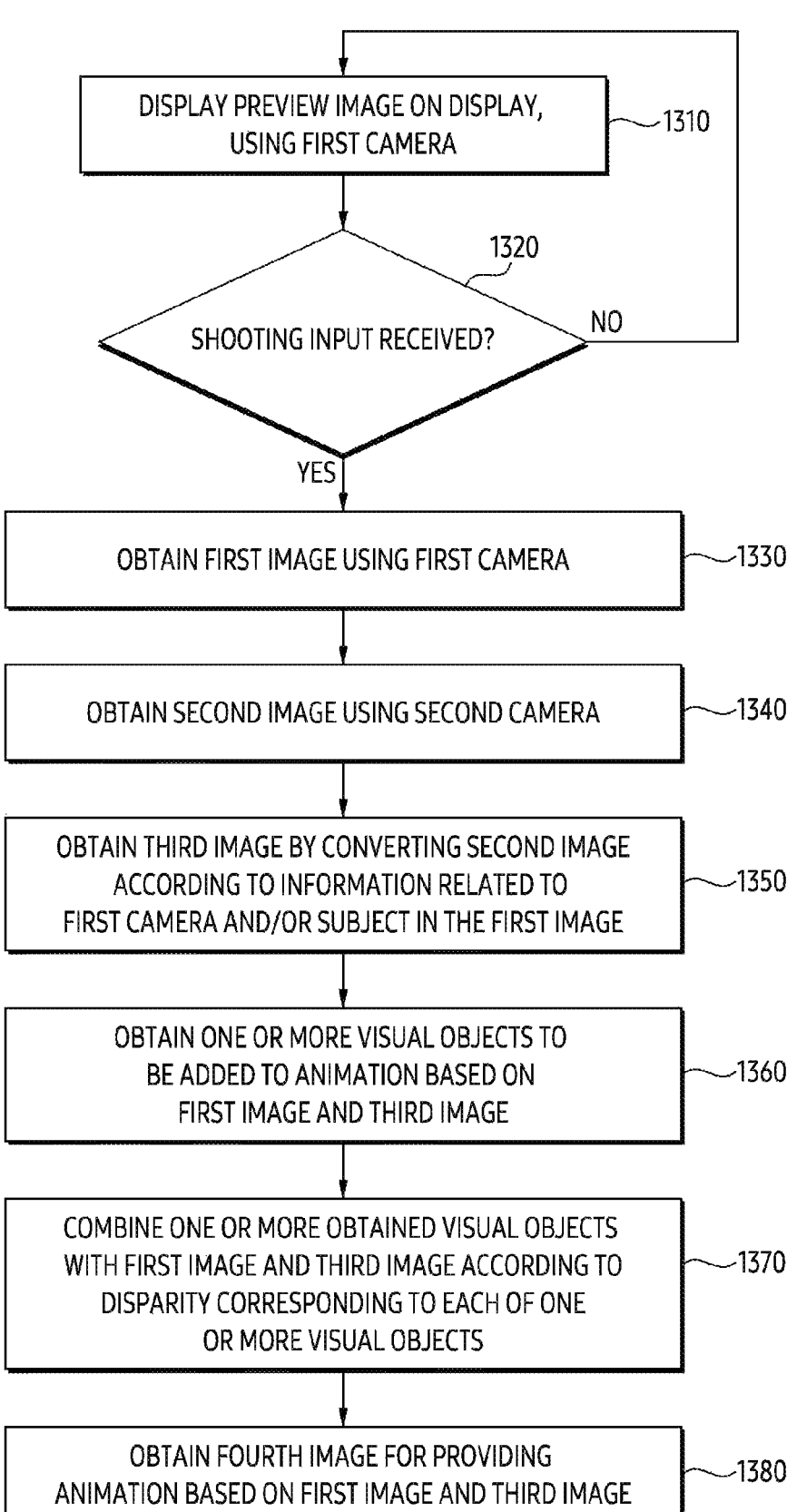
FIG. 13 is a flowchart illustrating an example operation of combining one or more visual objects having a disparity with each of a plurality of images by an example electronic device according to various embodiments.

FIG. 13 is a flowchart illustrating an operation of combining one or more visual objects having a disparity to each of a plurality of images by an electronic device according to various embodiments. The electronic device of FIG. 13 may correspond to the electronic device 101 of FIGS. 1 to 2. For example, at least one of the operations of FIG. 13 may be performed by the electronic device 101 of FIG. 1 and/or the processor 110 of the electronic device 101. The operations of FIG. 13 may be related to at least one of the operations of FIGS. 10, 11, and 12. The operations of FIG. 13 may be related to the operations of the electronic device 101 described above with reference to FIG. 7.

Referring to FIG. 13, in operation 1310, the electronic device according to various embodiments may use a first camera to display a preview image and a visual guide superimposed on the preview image on a display. For example, the electronic device may perform the operation 1310, similarly to the operation 1010 of FIG. 10 and/or the operation 1210 of FIG. 12.

Referring to FIG. 13, in operation 1320, the electronic device according to various embodiments may determine whether the electronic device has received a shooting input. For example, the electronic device may perform the operation 1320, similarly to the operation 1020 of FIG. 10 and/or the operation 1220 of FIG. 12. In response to receiving the shooting input ('Yes' in operation 1320), in operation 1330, the electronic device according to various embodiments may use the first camera to obtain the first image. For example, the electronic device may perform the operation 1330, similarly to the operation 1030 of FIG. 10 and/or the operation 1230 of FIG. 12. Referring to FIG. 13, in operation 1340, the electronic device according to various embodiments may use a second camera to obtain a second image. For example, the electronic device may perform the operation 1340, similarly to the operation 1040 of FIG. and/or the operation 1250 of FIG. 13. The electronic device according to various embodiments performing the operations 1330 and 1340 is not limited to the order shown in FIG. 13, and, for example, the electronic device may perform the operations 1330 and 1340 substantially simultaneously. Although not shown herein, the electronic device may use a sensor to obtain the distance between the subject and the electronic device, similarly to the operation 1240.

Referring to FIG. 13, in operation 1350, the electronic device according to various embodiments may obtain a third image by converting the second image according to information related to the first camera and/or the subject in the first image. The information may include, for example, a depth image (e.g., ToF image) obtained by a distance sensor (e.g., the distance sensor 154 of FIG. 1) included in the electronic device, and/or a distance reflected from a subject of laser light emitted from the distance sensor for focusing. For example, the electronic device may perform the operation 1350 similarly to the operation 1050 of FIG. 10 and/or the operation 1260 of FIG. 12.

Referring to FIG. 13, in operation 1360, the electronic device according to various embodiments may obtain one or more visual objects to be added to the animation based on the first image and the third image. The one or more visual objects may be independent of subjects included in the FOVs of the first camera and the second camera of the operations 1330 and 1340. The one or more visual objects may include, for example, a graphic object added by a user input related to the text 266 of FIG. 2.

Referring to FIG. 13, in operation 1370, the electronic device according to various embodiments may combine the obtained one or more visual objects with the first image and the third image according to a disparity corresponding to each of the one or more visual objects. For example, the electronic device may perform the operation 1370 similarly to those described above with reference to FIG. 7. In an embodiment, in response to obtaining the first image of the operation 1330, the electronic device may combine the second visual objects (e.g., the visual objects 712 and 722 of FIG. 7), which are distinguished from the first visual object included in the first image, with the first image. In various embodiments, in response to obtaining the third image of the operation 1370, the electronic device may combine the fourth visual objects (e.g., the visual objects 714 and 724 of FIG. 7), which are obtained by converting the second visual object to have a disparity with respect to the second visual object and distinguished from the third visual object included in the third image, with the third image.

Referring to FIG. 13, in operation 1380, the electronic device according to various embodiments may obtain a fourth image for providing an animation based on the first image and the third image. For example, the electronic device may perform the operation 1380 similarly to the operation 1060 of FIG. 10 and/or the operation 1270 of FIG. 12. The fourth image obtained by the electronic device based on the operation 1380 may represent an animation related to one or more subjects commonly included in the first image and the third image of the operations 1330 and 1360.

As described above, the electronic device according to various embodiments may simultaneously control a plurality of cameras in response to a single shooting input. A combination of a plurality of cameras simultaneously controlled by the electronic device may be distinguished based on a posture of the electronic device, such that a plurality of images obtained by the combination have a disparity. The electronic device according to various embodiments may change at least one of a plurality of acquired images to obtain an animation for providing a three-dimensional effect due to a disparity. The animation may be displayed to a user independently of a three-dimensional (3D) display and/or a polarizing display.

A solution may be required for a user to control a plurality of cameras included in the electronic device to obtain a stereoscopic photograph.

A solution for the electronic device to play back a multimedia content having a three-dimensional effect on a user may be required independently of a hardware component (e.g., a 3D display) designed to provide a three-dimensional effect.

As described above, an electronic device according to various embodiments may include a display, a plurality of cameras including a first camera and a second camera having a second field-of-view (FoV) different from a first FoV of the first camera, memory, and processor operatively coupled to the display, the plurality of cameras and the memory. The memory may store one or more instructions. The one or more instructions, when executed by the processor, may cause the processor to control the electronic device to display a preview image on the display, based on at least a portion of a plurality of images obtained through the first camera, each of the plurality of images including a first visual object corresponding to a subject included in the first FoV; receive a shooting input while displaying the preview image; in response to receiving the shooting input, obtain a first image including the first visual object through the first camera; obtain a second image including a second visual object corresponding to the subject through the second camera; obtain a third image that is converted from the second image and includes the second visual object having a size corresponding to a size of the first visual object; and obtain a fourth image to provide animation with respect to the subject, by displaying the third image after displaying the first image.

The electronic device according to various embodiments may generate a stereoscopy with only a single shooting input. The stereoscopy generated by the electronic device according to various embodiments may provide a three-dimensional effect to a user, independently of a hardware component designed to provide a three-dimensional effect.

For example, the electronic device may further include a sensor and the one or more instructions, when executed by the processor, may cause the processor to control the electronic device to, in response to receiving the shooting input, identify a distance between the electronic device and the subject using the sensor, and obtain the third image by converting the second image based on the identified distance.

For example, the one or more instructions, when executed by the processor, may cause the processor to control the electronic device to display a plurality of visual objects respectively corresponding to the plurality of subjects in the preview image, in a state that a plurality of subjects including the subject is included in the first FoV; display a visual guide superimposed on the first visual object, in response to receiving a user input for focusing the first visual object among the plurality of visual objects within the preview image; and identify the distance between the electronic device and the subject indicated by the visual guide by using the sensor, in response to receiving the shooting input after receiving the user input.

For example, the one or more instructions, when executed by the processor, may cause the processor to control the electronic device to convert the second image based on at least one of the distance between the electronic device and the subject identified by using the sensor, a zoom factor of the first camera associated with the first image, or data indicating position relationship between the first FoV and the second FoV.

For example, the plurality of cameras may further include a third camera having a third FoV different from the first FoV and the second FoV. The one or more instructions, when executed by the processor, may cause the processor to control the electronic device to, in response to receiving the shooting input, identify the second camera, the second camera being disposed at a position where an image having a disparity with respect to the first image can be obtained, from among the second camera and the third camera, as a camera to obtain the fourth image; and obtain the first image through the first camera and obtain the second image through the identified second camera.

For example, the one or more instructions, when executed by the processor, may cause the processor to control the electronic device to obtain a fourth image to provide the animation having a disparity with respect to the subject, by concatenating the third image obtained by converting the second image having a disparity with respect to the first image, with the first image in a time domain.

For example, the one or more instructions, when executed by the processor, may cause the processor to control the electronic device to, in response to obtaining the first image, combine a third visual object that is different from the first visual object and the second visual object, to the first image; and in response to obtaining the second image, combine a fourth visual object obtained by converting the third visual object to provide the animation having a disparity with respect to the third visual object, to the second image.

For example, the one or more instructions, when executed by the processor, may cause the processor to control the electronic device to, in response to obtaining the first image and the third image, obtain one or more fifth images between the first image and the third image by interpolating of the first image and the third image, and obtain the fourth image by concatenating the first image, the third image, and the one or more fifth images in a time domain.

As described above, in various embodiments, a method of an electronic device may include displaying, based on at least portion of a plurality of images obtained through a first camera among a plurality of cameras of the electronic device, a preview image on a display of the electronic device, each of the plurality of images including a first visual object corresponding to a subject included in a field-of-view (FoV) of the first camera; receiving a shooting input while displaying the preview image; in response to receiving the shooting input, obtaining a first image including the first visual object through the first camera; in response to receiving the shooting input, obtaining a second image including a second visual object corresponding to the subject through a second camera among the plurality of cameras different from the first camera; obtaining a third image that is converted from the second image and includes the second visual object having a size corresponding to a size of the first visual object; and obtaining, by displaying the third image after displaying the first image, a fourth image to provide animation with respect to the subject.

For example, the method may further include, in response to receiving the shooting input, identifying a distance between the electronic device and the subject by using a sensor of the electronic device. The obtaining the third image may further include obtaining the third image by converting the second image based on the identified distance.

For example, the displaying the preview image may further include, in a state that a plurality of subjects including the subject is included in the first FoV, displaying a plurality of visual objects respectively corresponding to the plurality of subjects in the preview image, including the first visual object, and displaying a visual guide superimposed on the first visual object, in response to receiving a user input for focusing the first visual object among the plurality of visual objects in the preview image. The identifying the distance may further include identifying the distance between the electronic device and the subject indicated by the visual guide, using a sensor, in response to receiving the shooting input after receiving the user input.

For example, the method may further include, in response to receiving the shooting input, identifying the second camera, among the second camera and the third camera, the second camera being disposed at a position where an image having a disparity with respect to the first image can be obtained, as a camera to obtain the fourth image.

For example, the obtaining the fourth image may further include obtaining the fourth image to provide the animation having a disparity with respect to the subject, by concatenating the third image, obtained by converting the second image having a disparity with respect to the first image, with the first image in a time domain.

For example, the method may further include, in response to obtaining the first image, combining a third visual object that is different from the first visual object and the second visual object, to the first image, and in response to obtaining the second image, combining a fourth visual object, obtained by converting the third visual object to provide the animation having a disparity with respect to the third visual object, to the second image.

For example, the method may further include, in response to obtaining the first image and the third image, obtaining one or more fifth images between the first image and the third image, based on interpolating of the first image and the third image, and the obtaining the fourth image may further include obtaining the fourth image, by concatenating the first image, the third image, and the one or more fifth images in a time domain.

As described above, an electronic device may include a display, a plurality of cameras having different field-of-views (FoVs), memory, and processor operatively coupled to the display, the plurality of cameras and the memory. The memory may store one or more instructions. The one or more instructions, when executed by the processor, may cause the processor to control the electronic device to display a preview image on the display by using a first camera among the plurality of cameras the preview image including a first visual object corresponding to a subject included in a first FoV to which the first camera is directed; receive a shooting input related to the first camera, while displaying the preview image; in response to receiving the shooting input, identify a second camera having a second FoV having a disparity with respect to the first FoV of the first camera and including the subject; and in response to identifying the second camera, obtain a first image including the first visual object through the first camera and obtain a second image including the second visual object corresponding to the subject through the identified second camera.

For example, the electronic device may further include a sensor. The one or more instructions, when executed by the processor, may cause the processor to control the electronic device to obtain a distance between the subject and the electronic device, using the sensor; in response to obtaining the first image, the second image and the distance, obtain a third image including the second visual object having a size associated with a size of the first visual object thin the first image, by converting the second image based on the distance; and obtain a fourth image to provide animation with respect to the subject, by concatenating the first image and the third image to each other in a time domain.

For example, the one or more instructions, when executed by the processor, may cause the processor to control the electronic device to in response to obtaining the first image, combine a third visual object distinct from the first visual object and the second visual object, to the first image, and in response to obtaining the second image, combine a fourth visual object, obtained by converting the third visual object to provide the animation having a disparity with respect to the third visual object, to the second image.

For example, the one or more instructions, when executed by the processor, may cause the processor to control the electronic device to while displaying the preview image, display a visual guide, superimposed on the first visual object corresponding to the subject, to receive a user input associated with conversion of the second image to obtain the third image.

For example, the one or more instructions, when executed by the processor, may cause the processor to control the electronic device to in response to obtaining the first image and the third image, obtain one or more fifth images between the first image and the third image, based on interpolating of the first image and the third image, and obtain the fourth image by concatenating the first image, the third image, and the one or more fifth images in a time domain.

As described above, in various embodiments, a method of an electronic device may include displaying a preview image on a display of the electronic device, using a first camera among a plurality of cameras included in the electronic device, the preview image including a first visual object corresponding to a subject included within a first FOV that the first camera faces; while displaying the preview image, receiving a shooting input associated with the first camera; in response to receiving the shooting input, identifying, from among the plurality of cameras, a second camera having a second FOV that includes the subject and has a disparity with respect to the FOV of the first camera; and in response to identifying the first camera and the second camera, obtaining a first image including the first visual object through the first camera, and obtaining a second image including a second visual object corresponding to the subject through the identified second camera.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic units (ALUs), digital signal processors, microcomputers, field programmable gate arrays (FPGAs), PLUS (programmable logic units), microprocessors, or any other device capable of executing and responding to instructions. The processing device may include an operating system OS and one or more software applications performed on the operating system. In addition, the processing device may access, store, manipulate, process, and generate data in response to execution of the software. For convenience of understanding, although one processing device may be described as being used, a person skilled in the art will appreciate that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer components and recorded in a non-transitory computer-readable medium. In this case, the medium may continuously store a computer-executable program or temporarily store the program for execution or download. In addition, the medium may be a variety of recording media or storage media in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floptical disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described below.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device; comprising:
   a display;
   a plurality of cameras including a first camera having a first field-of-view (FoV) and a second camera having a second field-of-view (FoV) different from the first FoV of the first camera;

memory including one or more storage media storing instructions; and at least one processor comprising processing circuitry; and wherein the instructions, when executed by the at least one processor individually or collectively, cause the electronic device to:

display, based on at least a portion of a plurality of images obtained through the first camera, a preview image on the display, wherein each of the plurality of images includes a first visual object corresponding to a subject included in the first FoV;

receive a shooting input while displaying the preview image;

in response to receiving the shooting input, obtain a first image including the first visual object through the first camera and obtain a second image including a second visual object corresponding to the subject through the second camera;

obtain a third image, which includes the second visual object, by scaling a portion of the second image based on a distance between the electronic device and the subject so that the second visual object has a size corresponding to a size of the first visual object in the first image; and obtain an animation with respect to the subject by displaying the third image after displaying the first image.

2. The electronic device of claim 1, comprising:

a sensor, and wherein the instructions, when executed by the at least one processor individually or collectively, cause the electronic device to:

in response to receiving the shooting input, identify the distance between the electronic device and the subject using the sensor, wherein the scaled portion of the second image has a FoV corresponding to the FoV of the first image and is determined based on the distance between the electronic device and the subject, and on a separation distance of the first camera and the second camera.

3. The electronic device of claim 2, wherein the instructions, when executed by the at least one processor individually or collectively, cause the electronic device to:

in a state that a plurality of subjects including the subject is included in the first FoV, display a plurality of visual objects respectively corresponding to the plurality of subjects in the preview image;

display a visual guide superimposed on the first visual object, in response to receiving an input for focusing the first visual object among the plurality of visual objects within the preview image; and identify the distance between the electronic device and the subject indicated by the visual guide using the sensor, in response to receiving the shooting input after receiving the focusing input.

4. The electronic device of claim 2, wherein the instructions, when executed by the at least one processor individually or collectively, cause the electronic device to:

Scale the second image further based on at least one of a zoom factor of the first camera associated with the first image, or data indicating position relationship between the first FoV and the second FoV.

5. The electronic device of claim 1, wherein wherein the instructions, when executed by the at least one processor individually or collectively, cause the electronic device to:

in response to receiving the shooting input, identify, as the second camera, one of a plurality of different cameras of the electronic device, each having a FoV different from the first FoV of the first camera, which is disposed at a position where an image having a disparity with respect to the first image can be obtained.

6. The electronic device of claim 1, wherein the instructions, when executed by the at least one processor individually or collectively, cause the electronic device to:

in response to obtaining the first image, combine a third visual object that is different from the first visual object and the second visual object to the first image; and in response to obtaining the second image, combine a fourth visual object that is obtained by converting the third visual object to provide an animation having a disparity with respect to the third visual object, to the second image.

7. The electronic device of claim 1, wherein the instructions, when executed by the at least one processor individually or collectively, cause the electronic device to:

in response to obtaining the first image and the third image, obtain one or more fourth images between the first image and the third image by an interpolating of the first image and the third image, wherein the animation is obtained by displaying the one or more fourth images after displaying the third image.

8. A method of an electronic device, comprising:

displaying, based on at least portion of a plurality of images obtained through a first camera among a plurality of cameras of the electronic device, a preview image on a display of the electronic device, wherein each of the plurality of images includes a first visual object corresponding to a subject included in a first field-of-view (FoV);

receiving a shooting input while displaying the preview image;

in response to receiving the shooting input, obtaining a first image including the first visual object through the first camera and obtaining a second image including a second visual object corresponding to the subject through a second camera among the plurality of cameras different from the first camera;

obtaining a third image, which includes the second visual object, by scaling a portion of the second image based on a distance between the electronic device and the subject so that the second visual object has a size corresponding to a size of the first visual object in the first image; and obtaining an animation with respect to the subject by displaying the third image after displaying the first image.

9. The method of claim 8, further comprising:

in response to receiving the shooting input, identifying the distance between the electronic device and the subject using a sensor of the electronic device, wherein the scaled portion of the second image has a FoV corresponding to the FoV of the first image and is determined based on the distance between the electronic device and the subject, and on a separation distance of the first camera and the second camera.

10. The method of claim 8, wherein the displaying the preview image comprises:

in a state that a plurality of subjects including the subject is included in the first FoV, displaying a plurality of visual objects respectively corresponding to the plurality of subjects in the preview image, including the first visual object; and displaying a visual guide superimposed on the first visual object in response to receiving an input for focusing the first visual object among the plurality of visual objects within the preview image, wherein identifying the distance comprises:

identifying the distance between the electronic device and the subject indicated by the visual guide using a sensor, in response to receiving the shooting input after receiving the focusing input.

11. The method of claim 8, wherein the method further comprises:

in response to receiving the shooting input, identifying, as the second camera, one of a plurality of different cameras of the electronic device, each having a FoV different from the first FoV of the first camera, which is disposed at a position where an image having a disparity with respect to the first image can be obtained.

12. The method of claim 8, further comprising:

in response to obtaining the first image, combining a third visual object that is different from the first visual object and the second visual object, to the first image; and in response to obtaining the second image, combining a fourth visual object, that is obtained by converting the third visual object to provide an animation having a disparity with respect to the third visual object, to the second image.

13. The method of claim 8, further comprising:

in response to obtaining the first image and the third image, obtaining one or more fourth images between the first image and the third image, by an interpolating of the first image and the third image, wherein the animation is obtained by displaying the one or more fourth images after displaying the third image.

14. A non-transitory computer readable storage medium storing instructions, wherein the instructions, when executed by an electronic device including a display and a plurality of cameras including a first camera having a first field-of-view (FoV) and a second camera having a second field-of-view (FoV) different from the first FoV, cause the electronic device to:

display, based on at least a portion of a plurality of images obtained through the first camera, a preview image on the display, wherein each of the plurality of images includes a first visual object corresponding to a subject included in the first FoV;

receive a shooting input while displaying the preview image;

in response to receiving the shooting input, obtain a first image including the first visual object through the first camera and obtain a second image including a second visual object corresponding to the subject through the second camera;

obtain a third image, which includes the second visual object, by scaling a portion of the second image based on a distance between the electronic device and the subject so that the second visual object has a size corresponding to a size of the first visual object in the first image; and obtain an animation with respect to the subject by displaying the third image after displaying the first image.

15. The non-transitory computer readable storage medium of claim 14, wherein the instructions, when executed by the electronic device of claim, cause the electronic device to:

in a state that a plurality of subjects including the subject is included in the first FoV, display a plurality of visual objects respectively corresponding to the plurality of subjects in the preview image;

display a visual guide superimposed on the first visual object, in response to receiving an input for focusing the first visual object among the plurality of visual objects within the preview image; and identify the distance between the electronic device and the subject indicated by the visual guide using a sensor, in response to receiving the shooting input after receiving the focusing input.

16. The non-transitory computer readable storage medium of claim 14, wherein the instructions, when executed by the electronic device of claim, cause the electronic device to:

Scale the second image further based on at least one of a zoom factor of the first camera associated with the first image, or data indicating position relationship between the first FoV and the second FoV.

17. The non-transitory computer readable storage medium of claim 14, wherein the instructions, when executed by the electronic device of claim, cause the electronic device to:

in response to receiving the shooting input, identify, as the second camera, one of a plurality of different cameras of the electronic device, each having a FoV different from the first FoV of the first camera, which is disposed at a position where an image having a disparity with respect to the first image can be obtained.

* * * * *